US011211074B2

(12) United States Patent
Candelore et al.

(10) Patent No.: US 11,211,074 B2
(45) Date of Patent: Dec. 28, 2021

(54) PRESENTATION OF AUDIO AND VISUAL CONTENT AT LIVE EVENTS BASED ON USER ACCESSIBILITY

(71) Applicant: SONY CORPORATION, Tokyo (JP)

(72) Inventors: Brant Candelore, San Diego, CA (US); Mahyar Nejat, San Diego, CA (US); Peter Shintani, San Diego, CA (US); Robert Blanchard, San Diego, CA (US)

(73) Assignee: SONY CORPORATION, Tokyo (JP)

( * ) Notice: Subject to any disclaimer, the term of this patent is extended or adjusted under 35 U.S.C. 154(b) by 369 days.

(21) Appl. No.: 16/433,328

(22) Filed: Jun. 6, 2019

(65) Prior Publication Data

US 2020/0388284 A1   Dec. 10, 2020

(51) Int. Cl.
*G10L 15/26* (2006.01)
*H04N 21/2187* (2011.01)
*H04N 21/44* (2011.01)

(52) U.S. Cl.
CPC ......... *G10L 15/26* (2013.01); *H04N 21/2187* (2013.01); *H04N 21/44008* (2013.01)

(58) Field of Classification Search
CPC ... G10L 15/265; G10L 15/26; H04N 21/4856; H04N 21/4884; H04N 7/0885; H04N 13/183; H04N 5/9207; H04N 7/0882; H04N 9/8238; H04N 2017/008; H04N 21/4221; H04N 21/4888
See application file for complete search history.

(56) References Cited

U.S. PATENT DOCUMENTS

| 7,881,713 | B2 | 2/2011 | Hale et al. |
| 10,489,496 | B1* | 11/2019 | Sen ................... H04N 21/4882 |
| 2005/0108026 | A1* | 5/2005 | Brierre ................. G06Q 50/10 |
| | | | 725/137 |
| 2005/0227614 | A1 | 10/2005 | Hosking et al. |

* cited by examiner

*Primary Examiner* — Nnenna N Ekpo
(74) *Attorney, Agent, or Firm* — Chip Law Group

(57) ABSTRACT

An information processing device includes circuitry that receives a user-input for selection of one of a visual accessibility feature and an aural accessibility feature and further receives a first audio segment from an audio capturing device at a live event. The first audio segment includes a first audio portion of the audio content and a first audio closed caption (CC) information. The circuitry controls display of first text information for the first audio portion and second text information for the first audio CC information, based on received user-input for the selection of the visual accessibility feature. The circuitry generates a second audio segment from the first audio segment based on a first audio characteristic of the first audio segment. The circuitry controls a playback of the generated second audio segment, based on the received user-input for the selection of the aural accessibility feature.

22 Claims, 8 Drawing Sheets

PRESENTATION OF AUDIO AND VISUAL CONTENT AT LIVE EVENTS BASED ON USER ACCESSIBILITY

REFERENCE

None.

FIELD

Various embodiments of the disclosure relate to audio and video presentation technologies and user accessibility technologies. More specifically, various embodiments of the disclosure relate to apparatus and method for presentation of audio and visual content at live events based on user accessibility.

BACKGROUND

Recent advancements in the field of user accessibility technologies and audio and video presentation technologies have led to an increase in use of subtitles and closed captions in videos, movies, or television programs. In certain scenarios, subtitles may be utilized by users across the world to watch a video, a movie, or a television program in a plurality of languages. The subtitles may be a translation of dialogues in a foreign language or a written rendering of dialogues in the same language. The subtitles have to be generated for an audio portion of the video beforehand, such that the subtitles are displayed along with the video. In such cases, subtitles are embedded in the video along with position markers that indicate where the subtitle should appear and disappear in the video. However, generating subtitles along with position markers beforehand may be tiresome and undesirable. In some other cases, the subtitles generated may not match with the actual dialogues in the video due to undesirable discrepancies in the position markers. Additionally, the subtitles displayed along with the video may still not be clearly visible to a plurality of users, such as visually-impaired users.

In certain other scenarios, closed captions may be displayed along with the video, where the closed captions include description of non-speech elements, such as noise of car in moving in a background, knock on a door, etc. The closed captions may be embedded in or packaged along with the video beforehand. For example, the closed captions may be utilized by some users, such as hearing-impaired users, to understand the video or the movie based on the closed captions. In some cases, the video may be transcribed by a human operator that may utilize computer to translate the phonetics of the audio into text to generate the closed captions. In such cases, the generated closed captions may be inaccurate due to difference in phonetics of the audio from a human speaker in different regions of the world, which may be undesirable, for example, for the hearing-impaired users.

Further limitations and disadvantages of conventional and traditional approaches will become apparent to one of skill in the art, through comparison of described systems with some aspects of the present disclosure, as set forth in the remainder of the present application and with reference to the drawings.

SUMMARY

An apparatus and method for presentation of audio and visual content at live events based on user accessibility is provided substantially as shown in, and/or described in connection with, at least one of the figures, as set forth more completely in the claims.

These and other features and advantages of the present disclosure may be appreciated from a review of the following detailed description of the present disclosure, along with the accompanying figures in which like reference numerals refer to like parts throughout.

DETAILED DESCRIPTION

Figure 1:
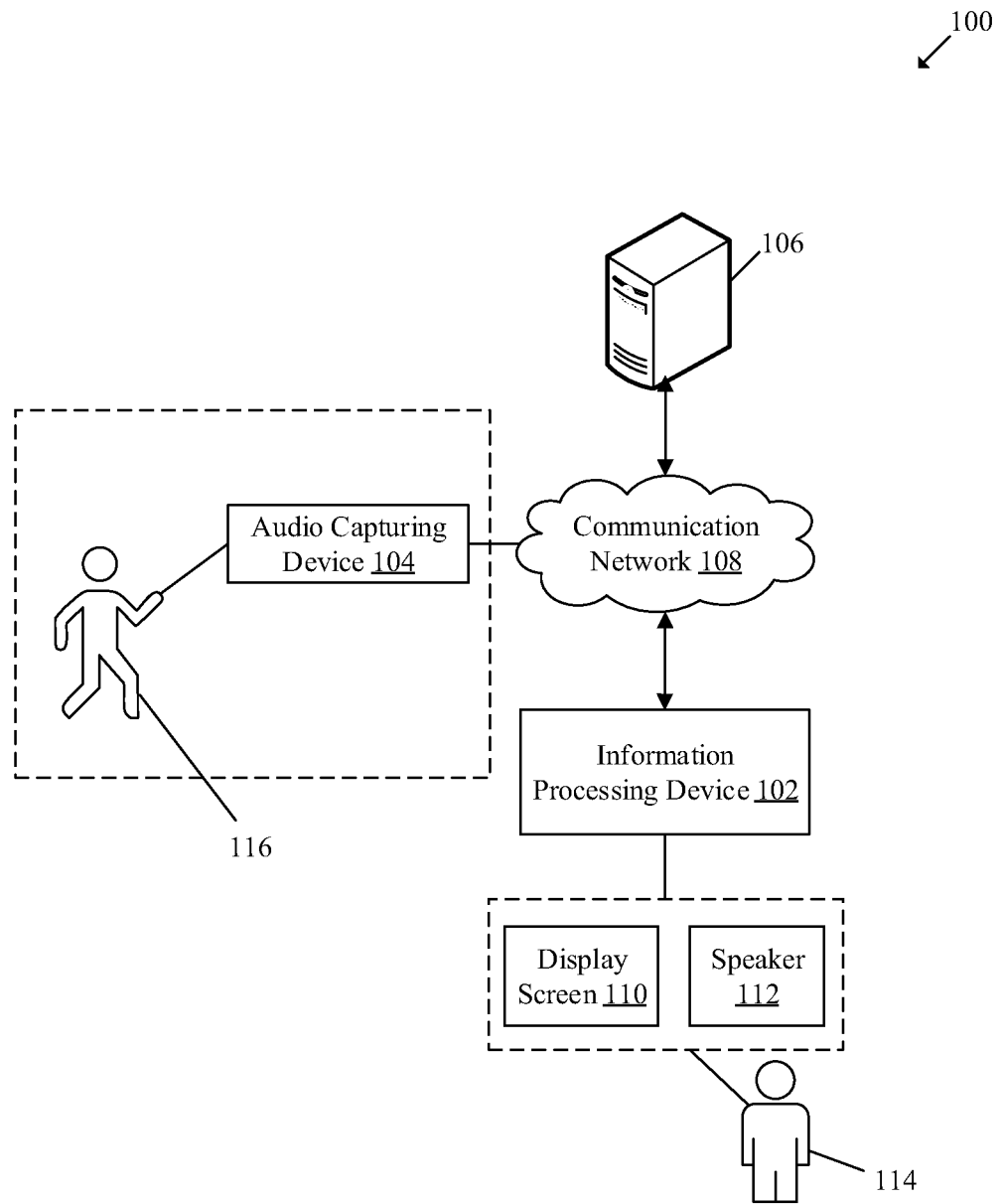
FIG. 1 is a block diagram that illustrates an exemplary network environment for presentation of audio and visual content at live events based on user accessibility, in accordance with an embodiment of the disclosure.

The following described implementations may be found in the disclosed apparatus and method for presentation of audio and visual content at live events based on user accessibility. Exemplary aspects of the disclosure provide an information processing device that may include circuitry configured to receive a user input for selection of one of a visual accessibility feature or an aural accessibility feature of the information processing device. The user-input may be received from a first user present at a live event. The information processing device may be further configured to receive a first audio segment captured from an audio capturing device. The first audio segment may correspond to audio content associated with one or more human speakers and may include a first audio portion of the audio content (e.g., a song) and a first audio closed caption (CC) information (non-song phrases that do not form a part of a song).

Traditionally, it is very difficult to understand the lyrics of a song sung in live venues, such as music halls, sports arenas, and the like. Many attendees (e.g., fans of a singer) often know the lyrics of hit songs, but not the less popular songs of musical artists. There are many reasons for the difficulty in understanding of the lyrics. For example, sound from musical instruments (with reverberation), the acoustics of the music hall, the volume/pitch of the voices, singers not enunciating correct phonetics, vowels and consonants stretched to match the melody, etc. Because the audience, and more specifically audience with any visual or hearing impairment, cannot actually understand the words of many songs, their enjoyment of the singing and overall concert is reduced. In contrast to conventional systems, the information processing device may be configured to control display of first text information for the first audio portion in a first display characteristic (for example, a first font style) and display second text information of the first audio CC information in a second display characteristic (for example, a second font style). For example, the first audio portion may correspond to a portion of a song that is sung by an artist in a live event and the first audio CC information may be phrases enunciated by the artist during the live event that may not be a part of the song, such as "Hello World", "Are You Enjoying?", and the like. In an example, the one or more human speakers may correspond to one or more artists performing in the live event, such as a singer, an orator, a dancer, and the like. The information processing device may control display of the first text information (e.g., a portion of song lyrics) and the second text information (e.g., non-song text) on the display screen such that display occurs at the same time when the artist is enunciating the first audio segment during the live event. The display of the first text information and the second text information may be helpful to a plurality of users who may hearing-impaired (or other users who are not hearing impaired) and want to understand what is performed in the live event by reading the text information. In some scenarios, such as in a live concert, a plurality of people in the audience may not understand what the artist is performing on stage. In such scenarios, the information processing device may be utilized to assist with understanding what the artist is singing while performing on the stage and also with understanding the other phrases the singer is enunciating which are not a part of the song.

The information processing device is further configured to generate a second audio segment from the received first audio segment, based on a first audio characteristic of the received first audio segment. The second audio is generated based on the received user input for the selection of the aural accessibility feature of the information processing device. The information processing device is further configured to control playback of the generated second audio segment via a speaker, based on the received user input for the selection of the aural accessibility feature. The second audio segment may be generated based on a change in a first audio characteristic of the first audio segment to a second audio characteristic of the second audio segment. For example, the second audio segment may be helpful to a plurality of users that may be visually-impaired, to listen to the second audio segment and understand each phrase that the artist is singing in the live event at the second audio characteristic. The plurality of users may select the second audio characteristic from a plurality of audio characteristics. For example, the second audio characteristic may correspond to a voice of a person a visually-impaired user is familiar to and understands the voice clearly. Additionally, in scenarios of a live concert, most part of the audience may be unable to understand lyrics of the song that a singer is singing due the rate of speech or the pronunciation of words. In such cases, the information processing device may modify the first audio characteristic to the second audio characteristic where the rate of speech may be a desired rate of speech based on a user-preference.

FIG. 1 is a block diagram that illustrates an exemplary network environment for presentation of audio and visual content at live events based on user accessibility, in accordance with an embodiment of the disclosure. With reference to FIG. 1, there is shown a network environment 100. The network environment 100 may include an information processing device 102, an audio capturing device 104, a server 106, and a communication network 108. The information processing device 102 may be communicatively coupled to a display screen 110 and a speaker 112. A first user 114 may be associated with the display screen 110 and the speaker 112. In some embodiments, the first user 114 may be associated with the information processing device 102. In such embodiments, the display screen 110 and the speaker 112 may be integrated with the information processing device 102. In some embodiments, the display screen 110 and the speaker 112 may be integrated with an external device that may be communicatively coupled to the information processing device 102. The information processing device 102 may be communicatively coupled to the audio capturing device 104 and the server 106, via the communication network 108. A first human speaker 116, such as a singer or other artist, may be associated with the audio capturing device 104.

The information processing device 102 may comprise suitable logic, circuitry, and interfaces that may be configured to receive a user input for selection of one of a visual accessibility feature or an aural accessibility feature. The information processing device 102 may be configured to receive a plurality of audio segments from the audio capturing device 104. The information processing device 102 may be a wearable device, a non-wearable device, an augmented-reality (AR) device, a virtual-reality (VR) device, a mixed-reality (MR) device, a consumer electronic (CE) device, portable devices, such as smartphones, or a combination thereof. Examples of the information processing device 102 may include, but are not limited to, a smart glass, a head-mounted device (HMD), a smartphone, a computing device.

The audio capturing device 104 may comprise suitable logic, circuitry, and interfaces that may be configured to capture a plurality of audio segments from the first human speaker 116. The plurality of audio segments may correspond to audio content. For example, the audio content may correspond to a known song that the first human speaker 116 may sing in a live event and the plurality of audio segments may correspond to segments of the song captured by the audio capturing device 104. Examples of the audio capturing device 104 may include, but are not limited to, a microphone, a recorder, a Musical Instrument Digital Interface (MIDI) keyboard.

The server 106 may comprise suitable logic, circuitry, and interfaces that may be configured to store the captured plurality of audio segments. The server 106 may be further configured to store the audio content. Examples of the server 106 may include, but are not limited to a database server, a file server, a web server, a cloud server, an application server, a mainframe server, or other types of server.

The communication network 108 may include a communication medium through which the information processing device 102, the audio capturing device 104, and the server 106, may communicate with each other. Examples of the communication network 108 may include, but are not limited to, the Internet, a cloud network, a Wireless Fidelity (Wi-Fi) network, a Personal Area Network (PAN), a Local Area Network (LAN), or a Metropolitan Area Network (MAN). Various devices in the network environment 100 may be configured to connect to the communication network 108, in accordance with various wired and wireless communication protocols. Examples of such wired and wireless communication protocols may include, but are not limited to, at least one of a Transmission Control Protocol and Internet Protocol (TCP/IP), User Datagram Protocol (UDP), Hypertext Transfer Protocol (HTTP), File Transfer Protocol (FTP), Zig Bee, EDGE, IEEE 802.11, light fidelity (Li-Fi), 802.16, IEEE 802.11s, IEEE 802.11g, multi-hop communication, wireless access point (AP), device to device communication, cellular communication protocols, and Bluetooth (BT) communication protocols.

The display screen 110 may comprise suitable logic, circuitry, and interfaces that may be configured to display a text information related to the plurality of audio segments captured by the audio capturing device 104. In some embodiments, the display screen 110 may be a touch screen, which may enable the first user 114 to provide input via the display screen 110. The touch screen may be at least one of a resistive touch screen, a capacitive touch screen, or a thermal touch screen. In some embodiments, the display screen 110 may be integrated with the information processing device 102 and may be an internal component of the information processing device 102. The display screen 110 may be realized through several known technologies such as, but not limited to, at least one of a Liquid Crystal Display (LCD) display, a Light Emitting Diode (LED) display, a plasma display, or an Organic LED (OLED) display technology, or other display screens. In accordance with an embodiment, the display screen 110 may refer to a display screen of a head mounted device (HMD), a smart-glass device, a see-through display, a projection-based display, an electro-chromic display, or a transparent display.

The speaker 112 may comprise suitable logic, circuitry, and interfaces that may be configured to playback an audio output corresponding to an input provided by the first user 114. In some embodiments, the speaker 112 may be integrated with the information processing device 102 and may be an internal component of the information processing device 102. Examples of the speaker 112 may include, but are not limited to, a headphone, a speaker of a smartphone, or in-ear headphones.

The first user 114 may be a user who may be associated with the information processing device 102. In some embodiments, the first user 114 may be a part of an audience in a live event, such as a live concert, a live conference, and the like. The first user 114 may provide an input to the information processing device 102. In accordance with an embodiment, the first user 114 may utilize an input device, such as a touch screen, a microphone, and the like, to provide an input to the information processing device 102. In accordance with an embodiment, the first user 114 may be a visually-impaired user or a hearing-impaired user.

The first human speaker 116 may be an artist who may be associated with the audio capturing device 104 and may perform at a live event. For example, the first human speaker 116 may be a singer that may perform at a live concert or may be a presenter of a live conference.

In operation, the information processing device 102 may be configured to receive a user input from the first user 114 present in a live event. The user input may be provided to select one of a visual accessibility feature or an aural accessibility feature of the information processing device 102. The visual accessibility feature and the aural accessibility feature may refer to features of the information processing device 102 that may be accessible to all users, regardless of a disability or impairment, such as visual-impairment or hearing-impairment. Visual-impairment may include different categories of visual impairment, such as visual acuity or clarity, light sensitivity, contrast sensitivity, field of vision, and color vision. The visual accessibility feature may be a feature of the information processing device 102 that may be selected by a user who may be hearing-impaired and may be unable to hear completely or partially, and thus may understand surrounding world through sight using at least the visual accessibility feature. The aural accessibility feature may correspond to feature of the information processing device 102 that may be selected by a user who may be visually-impaired and may be unable to see completely or partially, and thus may understand the surrounding world through sound using at least the aural accessibility feature. In accordance with an embodiment, the visual accessibility feature and the aural accessibility feature may be selected by the first user 114 based on a user preference (e.g., user preference set by the first user 114). In accordance with an embodiment, the first user 114 may provide a display-based input or a voice-based input to the information processing device 102.

In accordance with an embodiment, the audio capturing device 104 may be further configured to capture a first audio segment associated with the first human speaker 116. The first audio segment may correspond to audio content, such as a song sung by the first human speaker 116 at a live event. In accordance with an embodiment, the audio capturing device 104 may be configured to cancel surrounding noise such that the captured first audio segment of the first human speaker 116 is accurate and unaffected by unwanted surrounding noise. For example, the surrounding noise may correspond to, but not limited to, noise of musical instruments used during the live concert or sound from an audience of the live concert or event. The audio capturing device 104 may cancel the surrounding noise using a plurality of filters. The audio capturing device 104 may be configured to transmit the captured first audio segment to the information processing device 102 and the server 106, via the communication network 108. Similarly, the audio capturing device 104 may be further configured to capture a plurality of audio segments associated with the first human speaker 116. The plurality of audio segments may correspond to the audio content, such as a song. The audio capturing device 104 may be configured to transmit each of the plurality of audio segments to the information processing device 102 and the server 106, via the communication network 108.

In accordance with an embodiment, the information processing device 102 may be configured to receive the plurality of audio segments from the audio capturing device 104. A first audio segment of the plurality of audio segments may include a first audio portion of the audio content and a first audio closed caption (CC) information. For example, during a live concert, the audio content may be a song sung by a singer in a live concert, and thus, the first audio portion may be a portion of the song and the first audio CC information may be phrases enunciated by the singer while singing the song during the live event, such as "Hi there", "Clap your hands" etc.

The information processing device 102 may store lyrics information associated with the audio content. For example, the lyrics information associated with the audio content may be the lyrics of the song sung by the singer, such as the first human speaker 116, in the live concert. In another example, the lyrics information associated with the audio content (e.g., a song) may be a script of a live presentation. In accordance with an embodiment, the information processing device 102 may be configured to identify a position of the received first audio portion of received first audio segment in the audio content based on the stored lyrics information. The information processing device 102 may be further configured to extract the first text information (such as a phrase of a song) of the first audio portion in the stored lyrics information based on the identified position of the first audio portion in the audio content. Alternatively stated, the first text information of the first audio portion may be identified based on the stored lyrics information.

The information processing device 102 may further comprise a speech-to-text converter configured to convert the first audio CC information of the first audio segment to generate the second text information. The speech-to-text converter may be further configured to convert each word enunciated by the first human speaker 116 in the first audio CC information into text to generate the second text information. The information processing device 102 may be further configured to control display of first text information for the first audio portion and second text information for the first audio CC information on a display screen, such as the display screen 110. The display of the first text information and the second text information may be controlled based on the selected visual accessibility feature by the first user 114. For example, the speech to text converter may be configured to convert the phrases enunciated by a singer during the live concert that are not a part of the song, such as "Clap your hands" to generate the second text information. Further, the information processing device 102 may be further configured to detect the correct positioning (i.e., where to insert the second text information (e.g., Clap your hands") within the first text information in real time or near real time) for placement of the second text information and accordingly synchronize display the first text information along with the second text information on the display screen 110.

The information processing device 102 may be further configured to display the first text information for the first audio portion in a first display characteristic of a plurality of display characteristics. The information processing device 102 may be further configured to display the second text information for the first audio CC information in a second display characteristic of the plurality of display characteristics. For example, the first text information associated with the first audio portion of a song may be displayed using a first color, such as red color, and the second text information associated with the phrases enunciated by the singer during the concert may be displayed using a second color, such as blue color. In such a way a viewer of the concert, such as the first user 114 may distinguish between text associated with the song sung by the singer and phrases enunciated by the singer while singing the song. The information processing device 102 may be configured to select the first display characteristic and the second display characteristic from a plurality of display characteristics based on the received user input for the selection of the visual accessibility feature. The plurality of display characteristics may include, but are not limited to, a foreground color, a background color, a contrast value, a brightness value, a font style, or a font size of the first text information and the second text information displayed on the display screen 110. In accordance with an embodiment, the first display characteristic and the second display characteristic may be selected from the plurality of display characteristics based on a selection by the first user 114. The information processing device 102 may be configured to control the display of the first text information at a first position on the display screen 110 and the second text information at a second position on the display screen 110. The first position may be different from the second position on the display screen 110.

The first text information of the first audio portion and the second text information of the first audio CC information may be utilized by the first user 114 to understand the first audio segment by reading the displayed first text information and the second text information. The first text information and the second text information may be displayed on the display screen 110 such that the first user 114 may be able to read the first text information and the second text information as the first human speaker 116 enunciates the first audio segment. For example, a singer may sing a portion of a song at a first time instant and then interact with the audience at a second time instant. In this case, the information processing device 102 may be configured to display a first text associated with the portion of the song and a second text associated with the interaction of the singer with the audient, such as "Hello All", in real-time or near real time.

The first text information of the first audio information and the second text information of the first audio CC information may be synchronized such that the first text information is displayed when the first human speaker 116 enunciates the first audio portion and the second text information is displayed when the first human speaker 116 enunciates the first audio CC information. In accordance with an embodiment, the information processing device 102 may be configured to highlight a current word enunciated by the first human speaker 116 on the display screen 110 from the first text information and the second text information displayed on the display screen 110. Therefore, a plurality of users, that may be hearing-impaired, may understand the exact word that the first human speaker 116 may enunciate in the live event in real-time or near real-time.

In accordance with an embodiment, the information processing device 102 may be configured to store a set of voice models and a plurality of audio characteristics that includes the first audio characteristic and the second audio characteristic. Each voice model of the set of voice models may be a mathematical model that may be used to represent a natural voice of a human, such as a singer, a news reader, an anchor of an event, and the like. Each audio characteristic of the plurality of audio characteristics may be a combination of a plurality of voice parameters associated with one of the stored set of voice models or the one or more human speakers (such as the first human speaker 116) at the live event (or concert). The plurality of voice parameters may include, but are not limited to, a loudness parameter, an intonation parameter, an intensity of overtones, a voice modulation parameter, a pitch parameter, a tone parameter, a rate-of-speech parameter, a voice quality parameter, a phonetic parameter, a pronunciation parameter, a prosody parameter, a timbre parameter, and one or more psychoacoustic parameters. The first audio segment may be associated with a first audio characteristic of the plurality of audio characteristics. The first audio characteristic of the first audio segment may be a combination of the plurality of voice parameters associated with a voice model of the first human speaker 116. The voice model of the first human speaker 116 may be a mathematical model that may be used to represent a natural voice of the first human speaker 116.

In accordance with an embodiment, the information processing device 102 may be configured to generate a second audio segment from the received first audio segment. The second audio segment may be generated based on the first audio characteristic of the first audio segment. For example, the information processing device 102 may generate a new audio segment based on the first audio characteristic of the song sung by the singer in the live concert. The information processing device 102 may be configured to generate the second audio segment based on the received user input for the selection of the aural accessibility feature of the information processing device 102. The generated second audio segment may be associated with a second audio characteristic of the plurality of audio characteristics. The second audio characteristic of the second audio segment may correspond to a second combination of the plurality of voice parameters. The second audio characteristic may be different from the first audio characteristic. For example, the second audio characteristic of the second audio segment may be associated with a voice of a second singer who is different from a first singer who is singing the first audio segment in a live concert.

In accordance with an embodiment, the information processing device 102 may further include an audio converter configured to modify the first audio characteristic of the first audio segment to the second audio characteristic, to generate the second audio segment. The audio converter may modify at least one voice parameter, such as a pitch parameter, of the first combination of voice parameters associated with the first audio characteristic of the first audio segment to generate the second combination of voice parameters associated with the second audio characteristic of the second audio segment. The generated second combination of voice parameters may comprise the modified at least one voice parameter, such as the pitch parameter. The first audio characteristic may be modified in accordance with a first voice model of the stored set of voice models. The first voice model may be a voice model associated with a human subject who is different from the one or more human speakers, such as the first human speaker 116 at the live event. For example, the first voice model may be a voice model of a singer who is different from the singer present at the live event, or a voice model of a news reader who is different from the singer present at the live event. In accordance with an embodiment, the first voice model may be selected by the first user 114 from the stored set of voice models. In accordance with another embodiment, the audio converter may be configured to modify the first audio characteristic in accordance with a second voice model of the set of voice models. The second voice model may correspond to a human subject who uses the information processing device 102, for example the first user 114 associated with the information processing device 102. Alternatively stated, the first user 114 may select the second voice model associated with the first user 114 to modify the first audio characteristic to the second audio characteristic.

In accordance with an embodiment, the information processing device 102 may be configured to control playback of the generated second audio segment, via a speaker, such as the speaker 112, based on the received user input for the selection of the aural accessibility feature. The first user 114 may use the speaker 112 and listen to the second audio segment associated with the second audio characteristic. The first user 114 may understand each word of the generated second audio segment clearly, based on the second audio characteristic of the second audio segment. For example, in a scenario of a live concert, the first user 114 may select a voice model of a famous singer as the first voice model. In such scenario, the audio converter may be configured to convert the first audio characteristic of the first audio segment, in accordance with the first voice model selected by the first user 114 to generate the second audio characteristic of the second audio segment. Therefore, the speaker 112 may output the second audio segment to the first user 114, and the first user 114 in accordance with own comfort level may understand each word of enunciated by the first human speaker 116 based on the output second audio segment. Additionally, the audio converter may be configured to generate the second audio segment based on a change in a rate of speech of the first audio segment. The information processing device 102 may further change the rate of speech of the first audio segment based on an input from the first user 114.

In accordance with another embodiment, the first audio segment may further include a second audio portion of the audio content and a second audio CC information enunciated during the live event. The second audio portion and the second audio CC information of the first audio segment may be associated with a second human speaker. The second human speaker may be different from the first user 114 and the first human speaker 116. For example, in a live concert if there are two singers, then the first human speaker 116 may correspond to a first singer and the second human speaker may correspond to a second singer. The second audio portion in the first audio segment may be a portion of the audio content (e.g. song) enunciated by the second human speaker 116. The second audio CC information of the first audio segment may be the phrases enunciated by the second human speaker during the live concert, such as, "How are you people", "Are you enjoying?", etc.

In accordance with an embodiment, the information processing device 102 may be further configured to control the display of third text information for the second audio portion and display fourth text information for the second audio CC information on the display screen 110. The information processing device 102 may be further configured to control the display of the third text information and the fourth text information, based on the received user input for the selection of the visual accessibility feature of the information processing device 102. For example, the third text information may be text associated with the second portion of the song that is sung by a second singer in the live concert. Further, the fourth text information may be text associated with the phrases enunciated by the second singer that are not a part of the song. The speech-to-text converter may be configured to convert the second audio CC information of the first audio segment to generate the fourth text information for the second audio CC information. The third text information of the second audio portion may be displayed in a third display characteristic of the plurality of display characteristics. The third display characteristic may be different from the first display characteristic and the second display characteristic. The fourth text information of the second audio CC information may be displayed in a fourth display characteristic of the plurality of display characteristics. The fourth display characteristic may be different from the first display characteristic, the second display characteristic, and the third display characteristic.

In accordance with an embodiment, the information processing device 102 may be configured to control the display of the first text information and the second text information at a different position than the third text information and the fourth text information. For example, the first text information of the first audio portion and the second text information of the first audio CC information enunciated during the live event by the first human speaker 116 (such as the first singer) may be displayed at a first position on the display screen 110. Further, the third text information of the second audio portion and the fourth text information of the second audio CC information enunciated during the live event by the second human speaker (such as the second singer) may be displayed at a second position on the display screen 110. This allows a viewer, such as the first user 114, to distinguish who enunciated what type of words and at a what particular point in time (e.g., whether the words were a part of a known song lyrics or different words not previously part of song lyrics). In accordance with an embodiment, the information processing device 102 may be configured to control the display of a first image of the first human speaker 116 and a second image of the second human speaker on the display screen 110, based on the received user input for the selection of the visual accessibility feature. The information processing device 102 may receive the first image of the first human speaker 116 and the second image of the second human speaker from an image capturing device (not shown). The first image of the first human speaker 116 may be displayed with the first text information and the second text information and the second image of the second human speaker may be displayed with the third text information and the fourth text information on the display screen 110.

In accordance with another embodiment, the information processing device 102 may be communicatively coupled to a head mounted device (HMD), such as a smart glass. The HMD may comprise a display screen, such as the display screen 110, and a speaker, such as the speaker 112. The information processing device 102 may be configured to control the display screen 110 of the HMD to display the first text information and the second text information. The information processing device 102 may be further configured to control the speaker 112 of the HMD to playback the second audio segment. The HMD may be associated with the first user 114. The HMD may be a wearable device that may be worn by the first user 114 during the live event. In accordance with another embodiment, the information processing device 102 may comprise the HMD that may include the display screen 110 and the speaker 112.

In some embodiments, the information processing device 102 may be configured to control the speaker 112 to playback the generated second audio segment based on the received user input for the selection of the visual accessibility feature. In such scenarios, the information processing device 102 may be configured to control the speaker 112 to playback the second audio segment along with the display of the first text information and the second text information on the display screen 110. The first user 114 may be able to hear the generated second audio segment from the speaker 112 and visualize the first text information and the second text information on the display screen 110 together. For example, a user in the live concert may hear the song in a voice that is different from the voice of the singer performing in the live concert, and concurrently view, the first text information associated with the song and the second text information associated with the non-song phrases enunciated by the singer, on the display screen 110. The non-song phrases means words or phrases that do not form part of the predefined or stored song lyrics. In such scenarios, a plurality of users that may be partially hearing-impaired, such as users who suffer decrease in hearing ability, may be able to hear the second audio segment along with the first text information and the second text information displayed on the display screen 110. For example, if a user has a decreased hearing ability, then in such cases, the user may be able to listen to the second audio segment from the speaker 112 that may not be clear to the user, along with the displayed first text information and the second text information on the display screen 110.

In some embodiments, the information processing device 102 may be configured to control the display of the first text information and the second text information on the display screen 110, based on the received user input for the selection of the aural accessibility feature. In such scenarios, the information processing device 102 may be configured to display the first text information and the second text information along with the playback of the second audio segment from the speaker 112. Therefore, the first user 114 may be able to view the first text information and the second text information on the display screen 110 along with the playback of the second audio segment from the speaker 112. For example, a plurality of users who may be partially visually-impaired, may not be able to visualize the first text information and the second text information clearly, but may be able to view a partial vision of the first text information and the second text information on the display screen 110. In another example, if a user is color blind, then the user may be able to view the first text information and the second information without a difference in color on the display screen 110. In such scenarios, the plurality of users who may be partially visually-impaired, such as users with impaired-vision in one eye, users with color blindness, and the like, may be able to visualize the first text information and the second text information on the display screen 110 along with the playback of the second audio segment from the speaker 112

Figure 2:
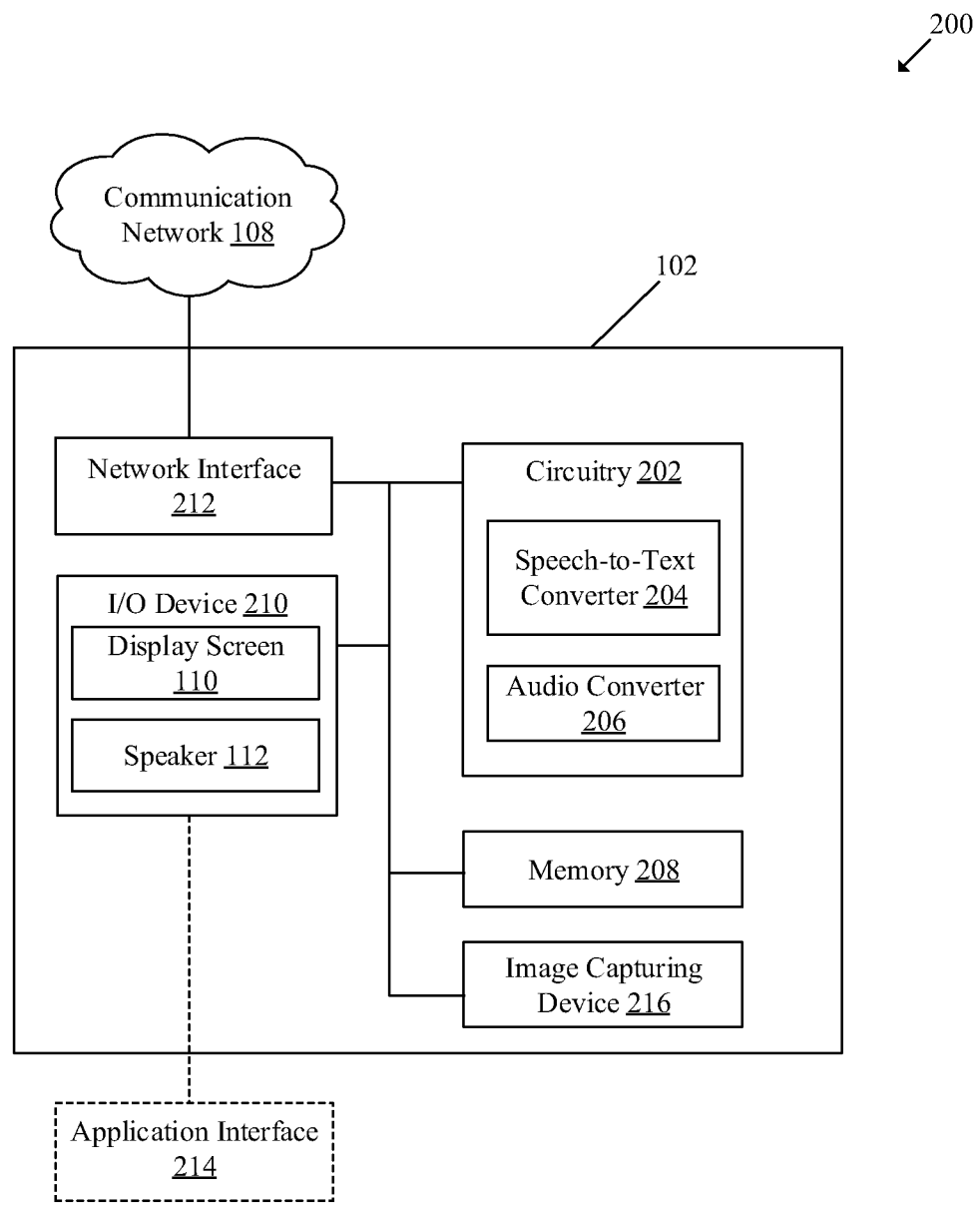
FIG. 2 is a block diagram that illustrates an exemplary information processing device for the presentation of audio and visual content at live events based on user accessibility, in accordance with an embodiment of the disclosure.

FIG. 2 is a block diagram that illustrates an exemplary information processing device for the presentation of audio and visual content at live events based on user accessibility, in accordance with an embodiment of the disclosure. FIG. 2 is explained in conjunction with elements from FIG. 1. With reference to FIG. 2, there is shown the information processing device 102. The information processing device 102 may include circuitry 202, a speech-to-text converter 204, an audio converter 206, a memory 208, an input/output (I/O) device 210, and a network interface 212. The I/O device 210 may include the display screen 110 and the speaker 112. The circuitry 202 may be communicatively coupled to the speech-to-text converter 204, the audio converter 206, the memory 208, and the I/O device 210. The circuitry 202 may be configured to communicate with the server 106, by use of the network interface 212. In some embodiments, the information processing device 102 may include an image capturing device 216.

The circuitry 202 may comprise suitable logic, circuit, and interfaces that may be configured to receive the user input for selection of one of the visual accessibility feature and the aural accessibility feature of the information processing device 102 from the first user 114. The circuitry may be configured to receive the first audio segment from the audio capturing device 104. The circuitry 202 may be further configured to control the display of the first text information and the second text information on a display screen, such as the display screen 110. The circuitry 202 may be further configured to control the playback of the second audio segment, via a speaker, such as the speaker 112. The circuitry 202 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The speech-to-text converter 204 may comprise suitable logic, circuitry, and interfaces that may be configured to convert the first audio CC information of the first audio segment to the second text information. In accordance with an embodiment, the speech-to-text converter 204 may be configured to convert the second audio CC information of the first audio segment to the fourth text information. The speech-to-text converter 204 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The audio converter 206 may comprise suitable logic, circuitry, and interfaces that may be configured to convert the first audio characteristic of the first audio segment to the second audio characteristic of the second audio segment. The audio converter 206 may be configured to modify the plurality of voice parameters associated with the first audio characteristic to generate the second audio characteristic of the second audio segment. The audio converter 206 may be implemented based on a number of processor technologies known in the art. Examples of the processor technologies may include, but are not limited to, a Central Processing Unit (CPU), X86-based processor, a Reduced Instruction Set Computing (RISC) processor, an Application-Specific Integrated Circuit (ASIC) processor, a Complex Instruction Set Computing (CISC) processor, a Graphical Processing Unit (GPU), and other processors.

The memory 208 may comprise suitable logic, circuitry, and interfaces that may be configured to store the received plurality of audio segments. The memory 208 may be further configured to store the lyrics information associated with the audio content. The memory 208 may be configured to store the plurality of audio characteristics and the set of voice models. Examples of implementation of the memory 208 may include, but are not limited to, Random Access Memory (RAM), Read Only Memory (ROM), Electrically Erasable Programmable Read-Only Memory (EEPROM), Hard Disk Drive (HDD), a Solid-State Drive (SSD), a CPU cache, and/or a Secure Digital (SD) card.

The I/O device 210 may comprise suitable logic, circuitry, and interfaces that may be configured to receive an input from a user, such as the first user 114, and provide an output to the first user 114, based on the received input from the first user 114. For example, the I/O device 210 may be utilized to receive the user input for selection of the visual accessibility feature or the aural accessibility feature of the information processing device 102. The I/O device 210 may include various input and output devices, which may be configured to communicate with the circuitry 202. Examples of the I/O device 210 may include, but are not limited to, a touch screen, a keyboard, a mouse, a joystick, a microphone, a display screen (for example, the display screen 110), and a speaker (for example, the speaker 112). In accordance with an embodiment, the I/O device 210 may include the display screen 110 and the speaker 112.

The network interface 212 may comprise suitable logic, circuitry, and interfaces that may be configured to facilitate communication between the information processing device 102, the audio capturing device 104, and the server 106, via the communication network 108. The network interface 212 may be implemented by use of various known technologies to support wired or wireless communication of the information processing device 102 with the communication network 108. The network interface 212 may include, but is not limited to, an antenna, a radio frequency (RF) transceiver, one or more amplifiers, a tuner, one or more oscillators, a digital signal processor, a coder-decoder (CODEC) chipset, a subscriber identity module (SIM) card, or a local buffer circuitry. The network interface 212 may communicate via wireless communication with networks, such as the Internet, an Intranet or a wireless network, such as a cellular telephone network, a wireless local area network (LAN), and a metropolitan area network (MAN). The wireless communication may use one or more of a plurality of communication standards, protocols and technologies, such as Global System for Mobile Communications (GSM), Enhanced Data GSM Environment (EDGE), wideband code division multiple access (W-CDMA), Long Term Evolution (LTE), code division multiple access (CDMA), time division multiple access (TDMA), Bluetooth, Wireless Fidelity (Wi-Fi) (such as IEEE 802.11a, IEEE 802.11b, IEEE 802.11g or IEEE 802.11n), voice over Internet Protocol (VoIP), light fidelity (Li-Fi), Worldwide Interoperability for Microwave Access (Wi-MAX), a protocol for email, instant messaging, and a Short Message Service (SMS).

The application interface 214 may correspond to a user interface (UI) rendered on a display screen, such as the display screen 110. The application interface 214 may display the first text information of the first audio portion and the second text information of the first audio CC information to the first user 114. An example of the application interface 214 may include, but is not limited to, a graphical user interface (GUI). In some embodiments, the display screen 110 may be an internal display screen integrated with the information processing device 102.

The image capturing device 216 may comprise suitable logic, circuitry, and interfaces that may be configured to capture a plurality of images of the live event. Examples of the image capturing device 216 may include, but are not limited to, a camera, an image sensor, a color sensor (such as a red-green-blue (RGB) sensor), and the like. The functions or operations executed by the information processing device 102, as described in FIG. 1, may be performed by the circuitry 202, the speech-to-text converter 204, and the audio converter 206. The operations executed by the circuitry 202, the speech-to-text converter 204, and the audio converter 206 are further described, for example, in the FIGS. 3A, 3B, 3C, 4, 5A, and 5B.

Figure 3A:
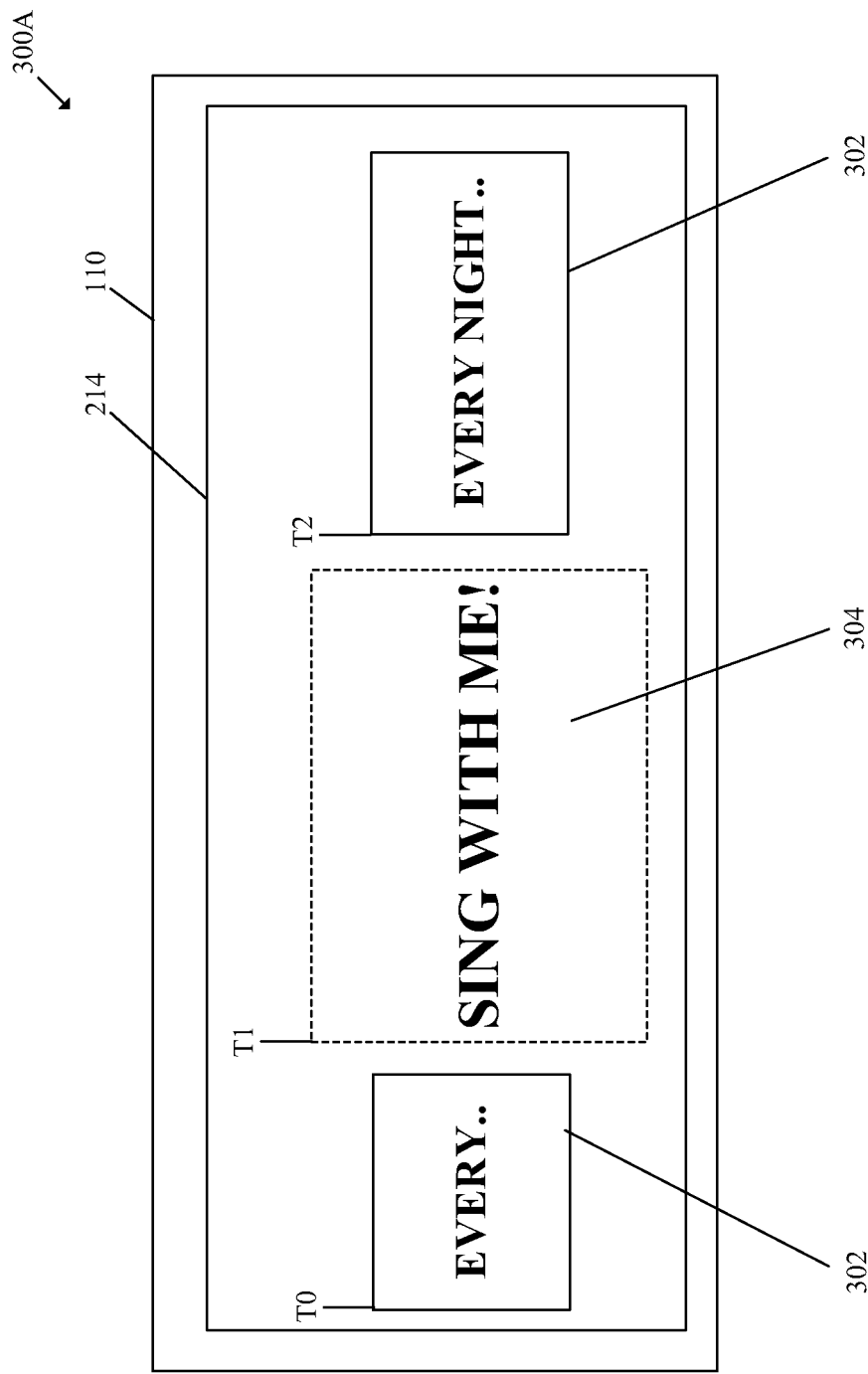
FIG. 3A illustrates a first exemplary scenario that depicts presentation of text information associated with an audio segment enunciated by a user in a live event based on user accessibility, in accordance with an embodiment of the disclosure.

FIG. 3A illustrates an exemplary scenario that depicts presentation of text information associated with an audio segment enunciated by a user in a live event based on user accessibility, in accordance with an embodiment of the disclosure. FIG. 3A is explained in conjunction with elements from FIG. 1 and FIG. 2. With reference to FIG. 3A, there is shown a first display scenario 300A at the information processing device 102. The first display scenario 300A may include the display screen 110 of the information processing device 102, the application interface 214, a first text 302, and a second text 304. The first text 302 may correspond to the first text information of the first audio portion that may be displayed on the display screen 110. The second text 304 may correspond to the second text information of the first audio CC information that may be displayed on the display screen 110, as described in FIG. 1.

In accordance with an embodiment, the circuitry 202 may be configured to control the display of the first text 302 and the second text 304 on the display screen 110, based on the received user input for the selection of the visual accessibility feature of the information processing device 102. For example, if a user, such as the first user 114, is hearing-impaired or partially hearing-impaired, and is attending a live concert then the first user 114 may utilize the information processing device 102 to understand and participate in the live concert even when the first user 114 may be unable to hear the audio during the live concert. In such scenarios, the first user 114 may select the visual accessibility feature of the information processing device 102 to visualize and understand a text information associated with the audio during the live concert.

The circuitry 202 may be configured to control the display of the first text 302 corresponding to the first text information of the first audio portion in a first display characteristic and display the second text 304 corresponding to the second text information of the first audio CC information in a second display characteristic. The circuitry 202 may be configured to select the first display characteristic of the first text 302 and the second display characteristic of the second text 304 from a plurality of display characteristics. The plurality of display characteristics may include a foreground color, a background color, a contrast value, a brightness value, a font style, or a font size of the first text information and the second text information displayed on the display screen 110. The circuitry 202 may be configured to control the display of the first text 302 in the first display characteristic and the second text 304 in the second display characteristic to differentiate between the first text 302 and the second text 304. The first text 302 may be a text output of the first audio portion of audio content (such as, a portion of a song sung by a singer in the live concert). The second text 304 may be text output of the first audio CC information (such as, non-song phrases enunciated by the singer during the live concert that are not a part of the song). In such cases, a user, such as the first user 114, who may be hearing-impaired may be able to differentiate between the first text 302 associated with a portion of a song sung in the live concert and the second text 304 associated with phrases enunciated by the singer during the live concert that are not a part of the song. In some embodiments, the first user 114 may select the first display characteristic of the first text 302 and the second display characteristic of the second text 304 from the plurality of display characteristics, such as a foreground color, a background color, a contrast value, a brightness value, a font style, or a font size. For example, as shown in FIG. 3A, the first text 302 (such as "Every" that may be text information associated with a portion of a song) may be displayed in a first font size and the second text 304 (such as "Sing With Me" that may be text information associated with a phrase enunciated by a singer during the live concert) may be displayed in a second font size, such that the second font size is greater than the first font size. In some embodiments, the first font size of the first text 302 and the second font size of the second text 304 may be selected by the first user 114.

In some scenarios, for example, a partially visually impaired user may select the font size of the first text 302 and the second text 304 based on an extent of visual disability of the partial visually impaired user, by using the application interface 214. In such cases, the partial visually impaired user may be able to view the first text 302 and the second text 304 clearly on the display screen 110, based on the selected font size suitable for viewing for the partial visually impaired user. In some other scenarios, for example, a hearing-impaired user may select the font size of the first text 302 and the second text 304 by using the application interface 214. In such cases, the hearing-impaired user to distinguish between a text associated with a portion of the song sung during the live concert and a text associated with a phrase enunciated by the singer during the live concert that is not a part of the song. In accordance with an embodiment, the first font size of the first text 302 may be greater than the second font size of the second text 304.

The circuitry 202 may be configured to control the display of the second text 304 of the first audio CC information integrated with first text 302 of the first audio portion of the audio content. The first text 302 and the second text 304 may be integrated on the display screen 110 such that the first user 114 may read the first text 302 and the second text 304 together when the first human speaker 116 enunciates the first audio segment. For example, the circuitry 202 may control display of the first text 302 and the second text 304 such that a user, such as the first user 114 may view text associated with a portion of the song sung by a singer in the live concert and also view text associated with phrases enunciated by the singer while singing the song (such as, "Sing with me") in real-time or near real-time. As shown in FIG. 3A, the first human speaker 116 may enunciate the first audio portion of the audio content (such as a portion of a song) at a first time instance "T0".

The circuitry 202 may be configured to control display of the first text 302 (e.g., "Every") associated with the first audio portion of the audio content on the display screen 110 at the first time instance "T0" or with some lag. The first human speaker 116 may enunciate the first audio CC information (such as, a phrase enunciated by a singer to interact with audience) at a second time instance "T1". The circuitry 202 may be configured to control display of the second text 304 (e.g., "Sing with me") associated with the first audio CC information at the second time instance "T1" or with some lag. The first human speaker 116 may again enunciate the first audio portion of the audio content (such as the portion of the song) at a third time instance "T2". The circuitry 202 may be configured to control display of the first text 302 (e.g., "Every Night") associated with the first audio portion of the audio content on the display screen 110 at the third time instance "T2" or with some lag. In such cases, the circuitry 202 may be configured to control display of the first text 302 and the second text 304 such that, the second text 304 associated with the phrase enunciated by the first human speaker 116 that is not a part of the audio content (such as, a song) is inserted between the first text 302 at the second time instance "T1" when the first human speaker enunciated the phrase. For example, the first text 302 and the second text 304 may be displayed side-by-side in a single line on the display screen 110.

Figure 3B:
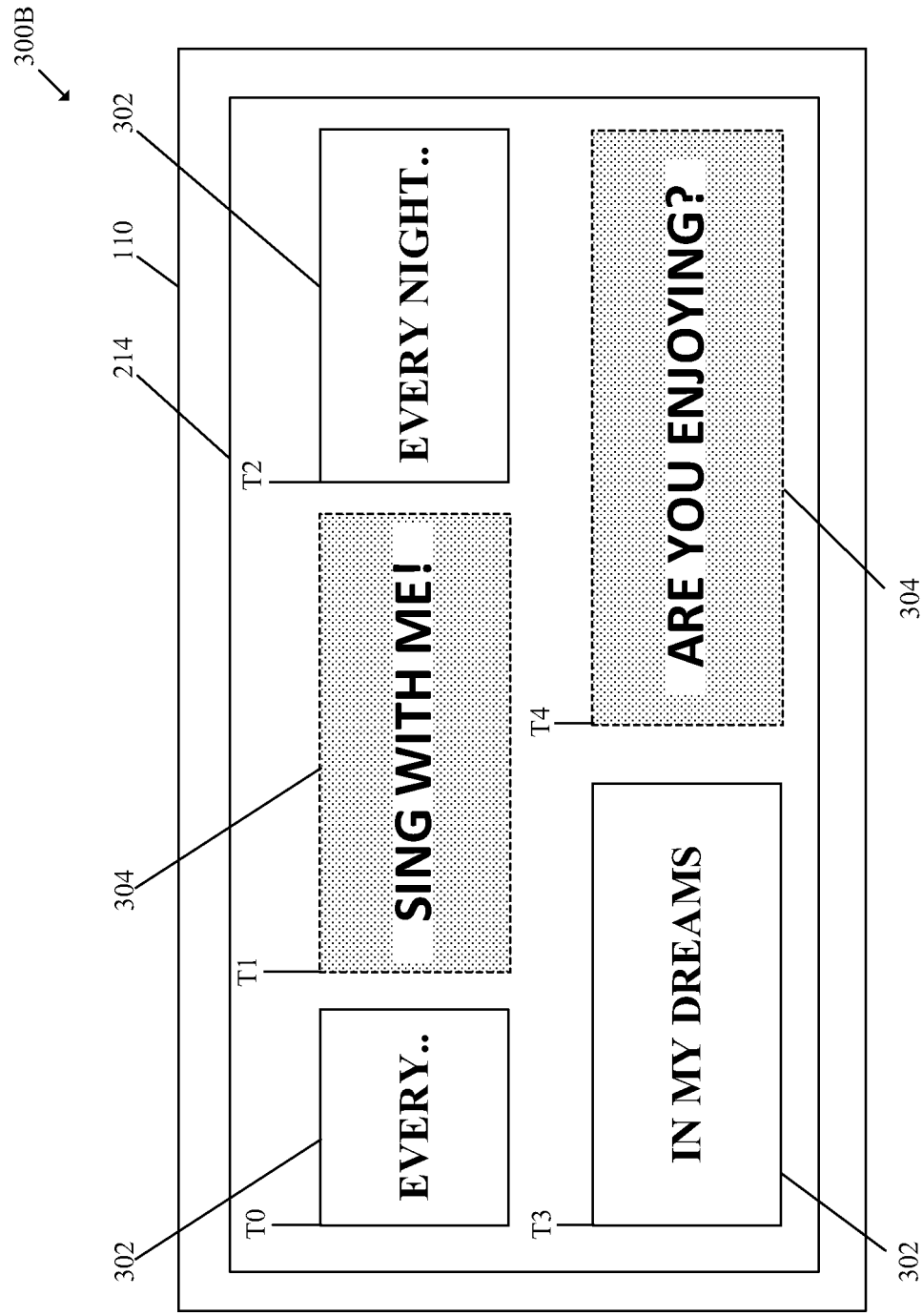
FIG. 3B illustrates a second exemplary scenario that depicts presentation of text information associated with an audio segment enunciated by a user in a live event based on user accessibility, in accordance with an embodiment of the disclosure.

FIG. 3B illustrates an exemplary scenario that depicts presentation of text information associated with an audio segment enunciated by a user in a live event based on user accessibility, in accordance with an embodiment of the disclosure. FIG. 3B is explained in conjunction with elements from FIG. 1 and FIG. 2. With reference to FIG. 3B, there is shown a second display scenario 300B at the information processing device 102. The second display scenario 300B may include the display screen 110 of the information processing device 102, the application interface 214, the first text 302, and the second text 304. The first text 302 may correspond to the first text information of the first audio portion and the second text 304 may correspond to the second text information of the first audio CC information.

In accordance with an embodiment, the circuitry 202 may be configured to control the display of the first text 302 with a first background color and display the second text 304 with a second background color on display screen 110, based on the received user input for the selection of the visual accessibility feature. The first background color of the first text 302 may be different from the second background color of the second text 304. For example, the first background color for the first text 302 may be yellow and the second background color for the second text 304 may be gray, which may help a user, such as the first user 114 to differentiate between the first text 302 (e.g., text associated with a portion of song) and the second text 304 (e.g., text associated with the phrases enunciated by the singer that are not a part of the song). In some embodiments, the first text 302 may be displayed with a first background pattern and the second text 304 may be displayed with a second background pattern. In some embodiments, a hearing-impaired user or a partially visually-impaired may provide an input to the information processing device 102 to select the first background color of the first text 302 and the second background color of the second text 304, by using the application interface 214. The first background color of the first text 302 and the second background color of the second text 304 may help the hearing-impaired user or the partially visually-impaired to differentiate between the first text 302 and the second text 304 displayed on the display screen 110 and understand the first audio segment enunciated by the first human speaker 116 by reading the first text 302 and the second text 304 in the live concert where the noise levels are very high to follow the singer and sing along with the singer. For example, as shown in FIG. 3B, the first text 302 (e.g., "Every") is displayed without a background pattern at the first time instance "T0" and the second text 304 (e.g., "Sing with me") is displayed with a dotted background pattern at the second time instance "T1".

In some embodiments, the first text 302 and the second text 304 may be displayed using a plurality of lines on the display screen 110. For example, as shown in FIG. 3B, the first text 302 (e.g., "In my dreams") associated with the first audio portion of the audio segment (e.g., a portion of a song) may be displayed in a second line on the display screen 110 at a fourth time instance "T3" or with some lag. The size of displayed text may depend on the level of user vision loss and may be displayed differently for different users.

Further, the second text 304 (e.g., "Are you enjoying?") associated with the first audio CC information (e.g., a phrase enunciated by the singer that is not a part of the song) may be displayed in the second line on the display screen 110 at a fifth time instance "T4" or with some lag. The first user 114 may view the first text 302 and the second text 304 (non-song phrases) on the display screen 110 to understand the first audio segment that may be enunciated by the first human speaker 116 during the live event (such as, live concert).

The different display characteristics of the first text 302 and the second text 304 as shown and described in FIGS. 3A and 3B may be utilized by a user (for example the first user 114) who may be hearing-impaired to understand and distinguish between the song lyrics and non-song phrases enunciated by a singer during the live event. This enhances the user engagement and entertainment experience. In accordance with an embodiment, the first display characteristic of the first text 302 and the second display characteristic of the second text 304 may be further differentiated based on the foreground color, a font style, a brightness value, a contrast value, etc.

Figure 3C:
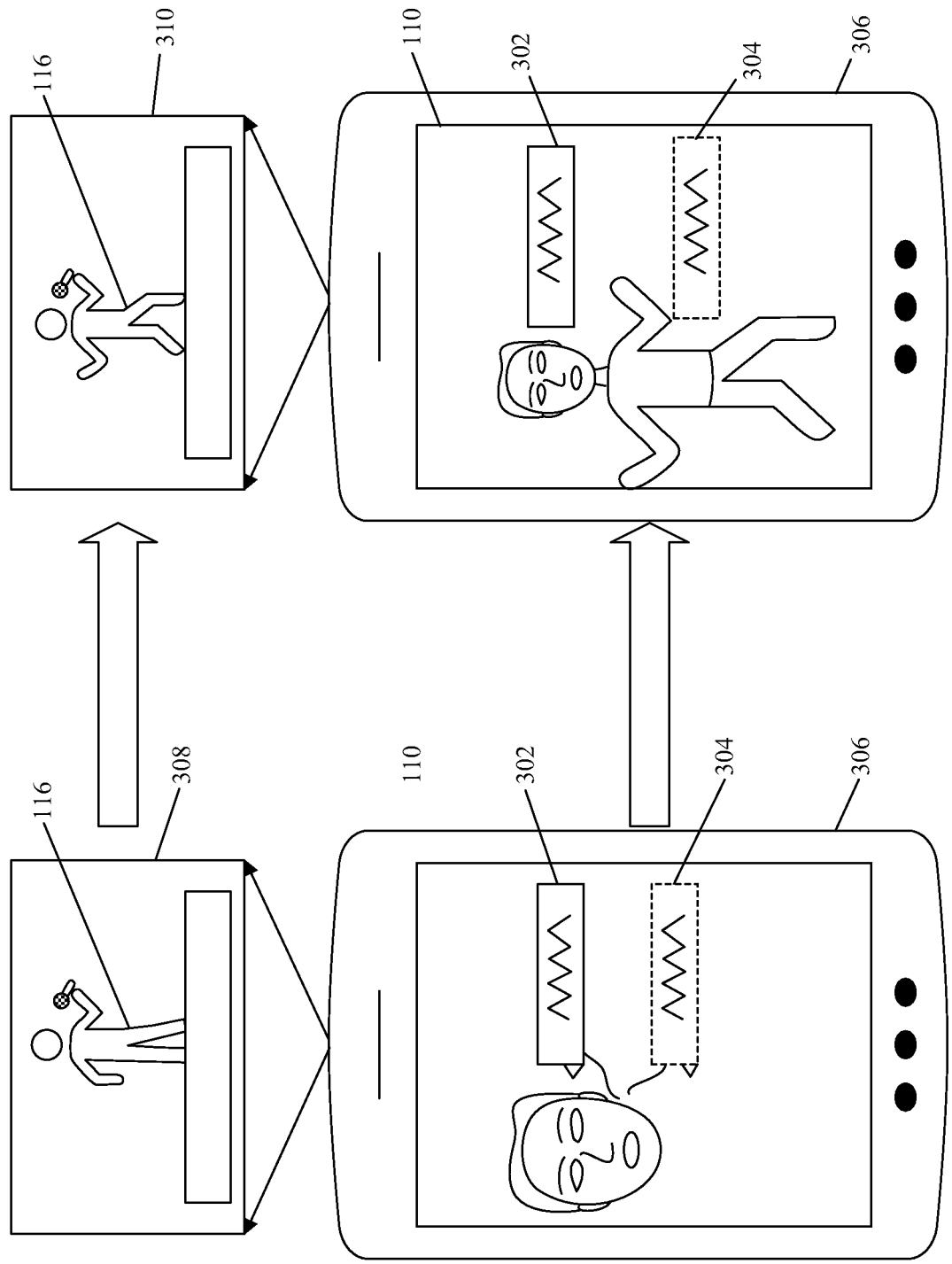
FIG. 3C illustrates an exemplary scenario that depicts concurrent presentation of video and text information associated with an audio segment enunciated by a user in a live event based on user accessibility, in accordance with an embodiment of the disclosure.

FIG. 3C illustrates an exemplary scenario that depicts concurrent presentation of video and text information associated with an audio segment enunciated by a user in a live event based on user accessibility, in accordance with an embodiment of the disclosure. FIG. 3C is explained in conjunction with elements from FIGS. 1, 2, 3A, and 3B. With reference to FIG. 3C, there is shown a smartphone 306, a first scene 308, a second scene 310, the first text 302, the second text 304, and the display screen 110. The first scene 308 and the second scene 310 may be a scene of a live event, such as a live concert. The first scene 308 and the second scene 310 may include the first human speaker 116 (for example, a singer in the live concert). In accordance with an embodiment, the smartphone 306 may correspond to the information processing device 102.

The smartphone 306 may include the circuitry 202 that may be configured to receive the first audio segment that includes the first audio portion of the audio content and the first audio CC information, as described in FIG. 1. The smartphone 306 may further include the image capturing device 216 that may be configured to capture a video of the first scene 308. For example, the first scene 308 may include the first human speaker 116, such as the singer, who may enunciate the first audio segment. The video of the first scene 308 may include a plurality of objects, for example, a plurality of musical instruments (not shown) on a stage in the live concert, a plurality of musicians (not shown) of the plurality of musical instruments. The circuitry 202 may be further configured to display only a portion of the video, e.g., a face portion, of a user (e.g., a singer) and hide remaining portion of the video. The circuitry 202 may be further configured to modify the displayed portion of the video, e.g., the face portion based on at least one of a current location of the smartphone 306 in the live concert hall or a distance and angle of the smartphone 306 from the singer or the stage in the live concert. The displayed portion of the video, e.g., the face portion, may be modified such that a user holding the smartphone 306 may view facial expressions and lips movement of the singer so as to enable singing together with the singer. In some embodiments, the circuitry 202 may be configured to extract facial details from other videos captured by different cameras installed at the live concert, and merge the details with the displayed portion of the video, e.g., the face portion. Alternatively stated, the circuitry 202 may be configured to display an enhanced view of an object, such as the first human speaker 116, of the plurality of objects in the captured video on the display screen 110. The circuitry 202 may be configured to display the enhanced view of the object, such as the first human speaker 116 based on a received user input for selection of the object (such as the first human speaker 116) from the plurality of objects in the captured video. The enhanced view of the object may be displayed such that a hearing-impaired or a visually impaired user may be able to visualize a clear view of lips movement and facial expressions of the first human speaker 116 (for e.g., the singer) irrespective of the location of the hearing-impaired or a visually impaired user in the live concert hall. For example, as shown in FIG. 3C, the circuitry 202 may be configured to display an enhanced view of the face portion of the first human speaker 116, such that the hearing-impaired user may see a lip movement of the first human speaker 116 and understand the phrases enunciated by the first human speaker 116.

The circuitry 202 may be further configured to control display of the first text 302 and the second text 304 over the hidden portion (non-face portion) of the video on the display screen 110 of the smartphone 306. The display of the first text 302 and the second text 304 may be based on the received user input to enable the visual accessibility feature. The first text 302 may be a portion of song lyrics, whereas the second text 304 may be non-song phrases. In accordance with an embodiment, the circuitry 202 may be further configured to display of the first text 302 at a first position and display the second text 304 at a second position on display screen 110. The first position of the first text 302 and the second position of the second text 304 may not coincide with the plurality of objects in the video of the first scene 308. For example, the first text 302 associated with the first text information of the first audio portion may be displayed at a top of the display screen 110 and the second text 304 associated with the first audio CC information may be displayed at a bottom of the display screen 110. In another example, the first text 302 may be displayed in a first half of the display screen 110 and the second text 304 may be displayed on a second half of the display screen 110. In such cases, the first user 114 may be able to differentiate between the first text 302 associated with the first audio portion of the audio content (for e.g., a portion of a song sung by a singer in a live concert) and the second text 304 associated with the first audio CC information (for e.g., phrases enunciated by the singer during the live concert that are not a part of the song). For example, the first user 114 may be able to differentiate between which text displayed on the display screen 110 is a part of the song and which text displayed on the display screen 110 is associated with the phrases enunciated by the singer which are not a part of the song.

The image capturing device 216 may be further configured to capture a video of the second scene 310. The circuitry 202 may be configured to detect a change in pose or a change in position of the first human speaker 116 during the live event. The circuitry 202 may be further configured to identify whether the detected change in pose or the change in position of the first human speaker 116 is an action-of-interest. The action-of-interest means a pose or an action performed by an artist, such as the first human speaker 116, which may be identified by the circuitry as of potential interest to audience. Thus, the circuitry 202 may be further configured to control selective display of the hidden portion (video portion other the displayed face portion) of the video of the second scene 310 on the display screen, such that the detected change in pose or the change in position of the first human speaker 116 (i.e., the action-of-interest) is displayed while other details, e.g., musicians, instruments etc., are automatically discarded. For example, as shown in FIG. 3C, the singer may change its pose from a standing pose in the first scene 308 to a dancing pose in the second scene 310. In such cases, for example, the circuitry 202 may be configured to display the full body view only of the singer in the dancing pose on the display screen 110, while hiding other details which may not be action-of-interest in the captured video.

The displayed video of the first human speaker 116 in the dancing pose on the display screen 110 may help the first user 114 who may be partially visually-impaired or hearing-impaired to visualize the pose of the first human speaker 116 on the display screen 110. For example, if the partially visually-impaired or hearing-impaired user is at a far distance from the first human speaker 116 (such as the singer) during the live concert, then the partially visually-impaired or hearing-impaired user may visualize the displayed video portion of the first human speaker 116 (such as the singer) on the display screen 110 of the smartphone 306. The circuitry 202 may be further configured to control display of the first text 302 and the second text 304 on the display screen 110 based on the received user input for the selection of the visual accessibility feature. The circuitry 202 may be configured to overlay the first text 302 and the second text 304 on the video of the second scene 310 displayed on the display screen. The first text 302 may be associated with the first display characteristic and the second text 304 may be associated with a second display characteristic, as shown and described in FIGS. 3A and 3B. The displayed video of the first scene 308 and the second scene 310 and the overlaid first text 302 and the second text 304 may be in synchronization with a corresponding received audio segment from an audio capturing device, such as the audio capturing device 104. For example, a user, such as the first user 114 may able to visualize a text associated with an audio segment sung by a singer during a live concert on a display screen, such as the display screen 110.

Figure 4:
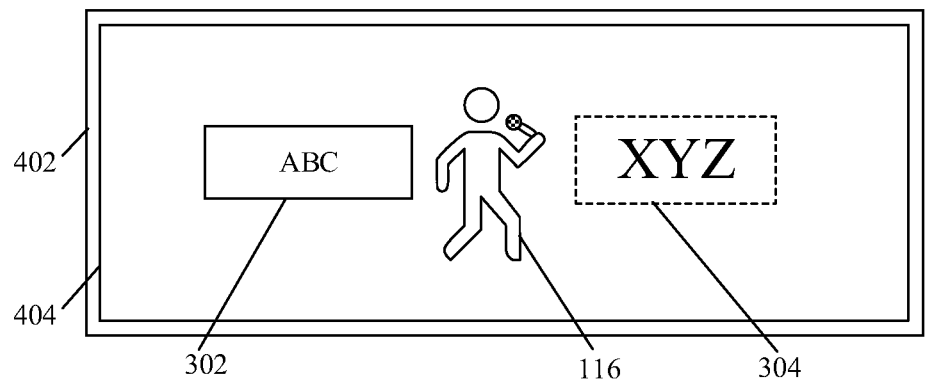
FIG. 4 illustrates an exemplary scenario that depicts presentation of one or more images along with text information from an audio segment enunciated by a user in a live event, in accordance with an embodiment of the disclosure.

FIG. 4 illustrates an exemplary scenario that depicts presentation of one or more images along with text information from an audio segment enunciated by a user in a live event, in accordance with an embodiment of the disclosure. FIG. 4 is explained in conjunction with elements from FIGS. 1, 2, 3A, 3B, and 3C. With reference to FIG. 4, there is shown a display screen 404 of a HMD 402, a representation of the first human speaker 116, the first text 302, and the second text 304. The HMD 402 may correspond to the information processing device 102 and may include the circuitry 202. The display screen 404 of the HMD 402 may correspond to the display screen 110 (FIG. 1). In accordance with an embodiment, the circuitry 202 may be configured to control the display of the first text 302 of the first audio portion and the second text 304 of the first audio CC information on the display screen 404, based on the received user input for the selection of the visual accessibility feature of the HMD 402. The first text 302 may be a text associated with the first audio portion of the audio content (e.g. a portion of the song) and the second text 304 may be a text associated with non-song phrases enunciated by the first human speaker 116 during the live event (e.g. non-song phrases that are not a part of the song, such as "Are you enjoying?").

In accordance with an embodiment, the circuitry 202 may be further configured to control the display of a first image of the first human speaker 116. The display screen 404 of the HMD 402 may be a see-through display. The circuitry 202 may be configured to control the display screen 404 to adjust the position of the first text 302 and the second text 304 on the display screen 404 such that the displayed first text 302 and the second text 304 does not coincide with the first image of the first human speaker 116. The first text 302 may be displayed at a first position and the second text 304 may be displayed at a second position, where the first position is different from the second position. The first position of the first text 302 and the second position of the second text 304 may be useful to the first user 114 to distinguish between a text information associated with the first audio portion of the audio content (e.g., a portion of a song) and a text information associated with the first audio CC information (e.g., non-phrases enunciated by a singer that are not a part of the song). Additionally, the first text 302 may be displayed in a first display characteristic and the second text 304 may be displayed at the second display characteristic, as shown and described in FIGS. 3A, 3B and 3C. The first text 302 and the second text 304 displayed on the display screen 404 in real-time or near real-time in synchronization with the first audio segment enunciated by the first human speaker 116 during the live event. For example, the first user 114 may visualize the first text 302 and the second text 304 on the display screen 404 when the singer sings the first audio segment in real-time or near real-time. In accordance with an embodiment, during the live event, as the first human speaker 116 changes its position on a stage, a position of the first image of the first human speaker 116 may be updated on the display screen 404. The circuitry 202 may be configured to control the display screen 404 to update the first position of the first text 302 and the second position of the second text 304, based on the position of the first image of the first human speaker 116.

Figure 5A:
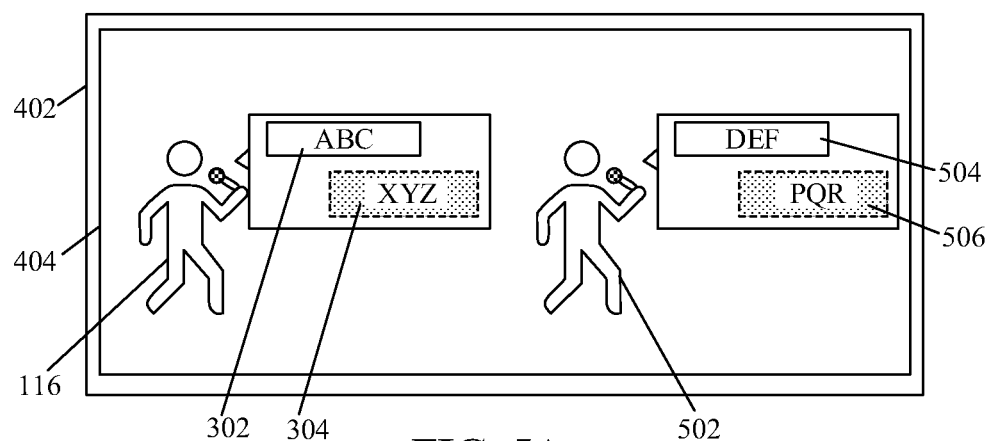
FIG. 5A illustrate an exemplary scenario for presentation of content at a live event enunciated by a plurality of different users in a live event based on user accessibility, in accordance with an embodiment of the disclosure.

FIG. 5A illustrate an exemplary scenario for presentation of audio and visual content at a live event enunciated by a plurality of different users in a live event based on user accessibility, in accordance with an embodiment of the disclosure. FIG. 5A is explained in conjunction with elements from FIGS. 1, 2, 3A, 3B, 3C, and 4. With reference to FIG. 5A, there is shown the HMD 402, the display screen 404 of the HMD 402, the first human speaker 116, the first text 302, the second text 304, a second human speaker 502, a third text 504 and a fourth text 506. The second human speaker 502 may be a second artist that may be performing at the live event along with the first human speaker 116. The third text 504 may correspond to a third text information associated with a second audio portion of the first audio segment. The fourth text 506 may correspond to a fourth text information associated with a second audio CC information enunciated by the second human speaker 502 in the live event. For example, the first human speaker 116 may be a male singer and the second human speaker 502 may be a female singer performing in a live concert.

In accordance with an embodiment, the received first audio segment may further comprise the second audio portion (female voice) of the audio content and the second audio CC information enunciated by the second human speaker 502. The circuitry 202 may be configured to control the display of the first text 302, the second text 304, the third text 504, and the fourth text 506 on the display screen 404 of the HMD 402, based on the visual accessibility feature as the received user-input. As shown in FIG. 5A, the circuitry 202 may be configured to control the display of the first text 302 of the first audio portion and the second text 304 of the first audio CC information enunciated by the first human speaker 116 at a first position on the display screen 404. The circuitry 202 may be further configured to control the display of the third text 504 of the second audio portion and the fourth text 506 of the second audio CC information enunciated by the second human speaker 502 at a second position on the display screen 404. For example, the first text 302 and the second text 304 may be displayed near a mouth portion of the first human speaker 116 on the display screen 404 and the third text 504 and the fourth text 506 may be displayed near a mouth portion of the second human speaker 502 on the display screen 404. In such cases, the first user 114 (a visually impaired user) may be able to distinguish between the first text 302 and the second text 304 associated with the first human speaker 116 (e.g. first singer) and the third text 504 and the fourth text 506 associated with the second human speaker 502 (e.g. second singer). The third text 504 may be displayed in a third display characteristic of the plurality of display characteristics and the fourth text may be displayed in a fourth display characteristic of the plurality of display characteristics. The plurality of display characteristics may include the foreground color, the background color, the contrast value, the brightness value, the font style, or the font size. In accordance with an embodiment, the circuitry 202 may be further configured to control the display of a first image of the first human speaker 116 and a second image of the second human speaker 502 on the display screen 404 of the HMD 402. The first image of the first human speaker 116 and the second image of the second human speaker 502 may be at different positions on the display screen 404, based on positions of the first human speaker 116 and the second human speaker 502 on the stage during the live event. The circuitry 202 may receive the first image of the first human speaker 116 and the second image of the second human speaker 502 from an image capturing device, such as the image capturing device 216.

In accordance with an embodiment, the circuitry 202 may be configured to link the first text 302 and the second text 304 to the first position with the first human speaker 116. Alternatively stated, the circuitry 202 may be configured to pin the first text 302 and the second text 304 with the first image of the first human speaker 116. In cases where the position of the first image of the first human speaker 116 changes on the display screen 404, the first position of the first text 302 and the second text may be updated based on the change in position of the first image of the first human speaker 116. Similarly, the circuitry 202 may be configured to pin the third text 504 and the fourth text 506 with the second image of the second human speaker 502. If the position of the second image of the second human speaker 502 changes on the display screen 404, the second position of the third text 504 and the fourth text 506 may be updated based on the change in position of the second image of the second human speaker 502.

Figure 5B:
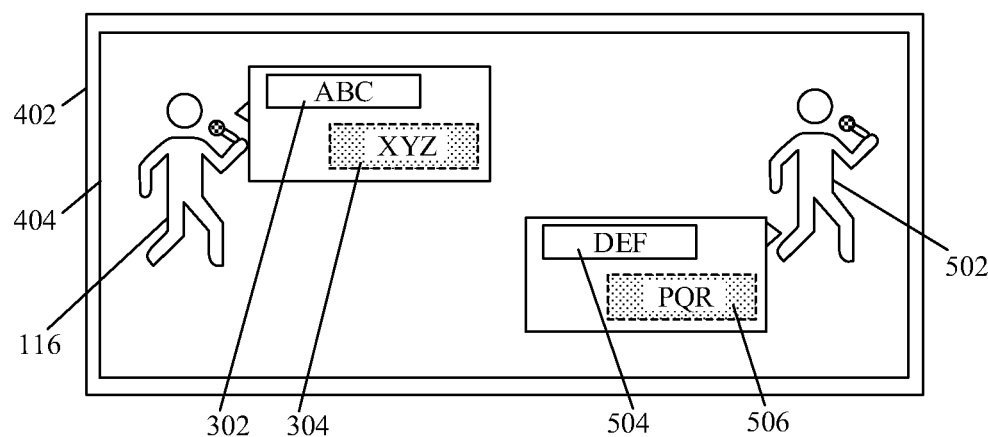
FIG. 5B illustrate an exemplary scenario for presentation of content at a live event enunciated by a plurality of different users in a live event based on user accessibility, in accordance with an alternative embodiment of the disclosure.

FIG. 5B illustrate an exemplary scenario for presentation of audio and visual content at a live event enunciated by a plurality of different users in a live event based on user accessibility, in accordance with an alternative embodiment of the disclosure. FIG. 5B is explained in conjunction with elements from FIGS. 1, 2, 3A, 3B, 3C, 4, and 5A.

With reference to FIG. 5B, there is shown the HMD 402, the display screen 404 of the HMD 402, the first human speaker 116, the first text 302, the second text 304, the second human speaker 502, the third text 504 and the fourth text 506. In accordance with an embodiment, the circuitry 202 may be configured to control the display of the first text 302, the second text 304, the third text 504, and the fourth text 506 on the display screen 404 of the HMD 402, based on the received user input for selection of the visual accessibility feature. As shown in FIG. 5B, for example, the circuitry 202 may be configured to control the display of the third text 504 and the fourth text 506 at a third position on the display screen 404, based on a selection by the first user 114 or selections at majority of user devices in the audience in the live event (other than the user device of the first user 114 in the audience). In such scenario, the HMD 402 may be associated with the first user 114. The third position of the third text 504 and the fourth text 506 may be different than the second position of the third text 504 and the fourth text 506 as shown and described in FIG. 5A. For example, as shown in FIG. 5B, the first text 302 and the second text 304 may be displayed near face of the first human speaker 116 and the third text 504 and the fourth text 506 may be displayed near feet of the second human speaker 502. In accordance with an embodiment, the circuitry 202 may be configured to pin the third text 504 and the fourth text 506 with the second human speaker 502 based on a total number of instructions, where each instruction is received from the user-devices. If the position of the second image of the second human speaker 502 changes on the display screen 404, the third position of the third text 504 and the fourth text 506 may be updated based on the change in position of the second image of the second human speaker 502.

Figure 6A:
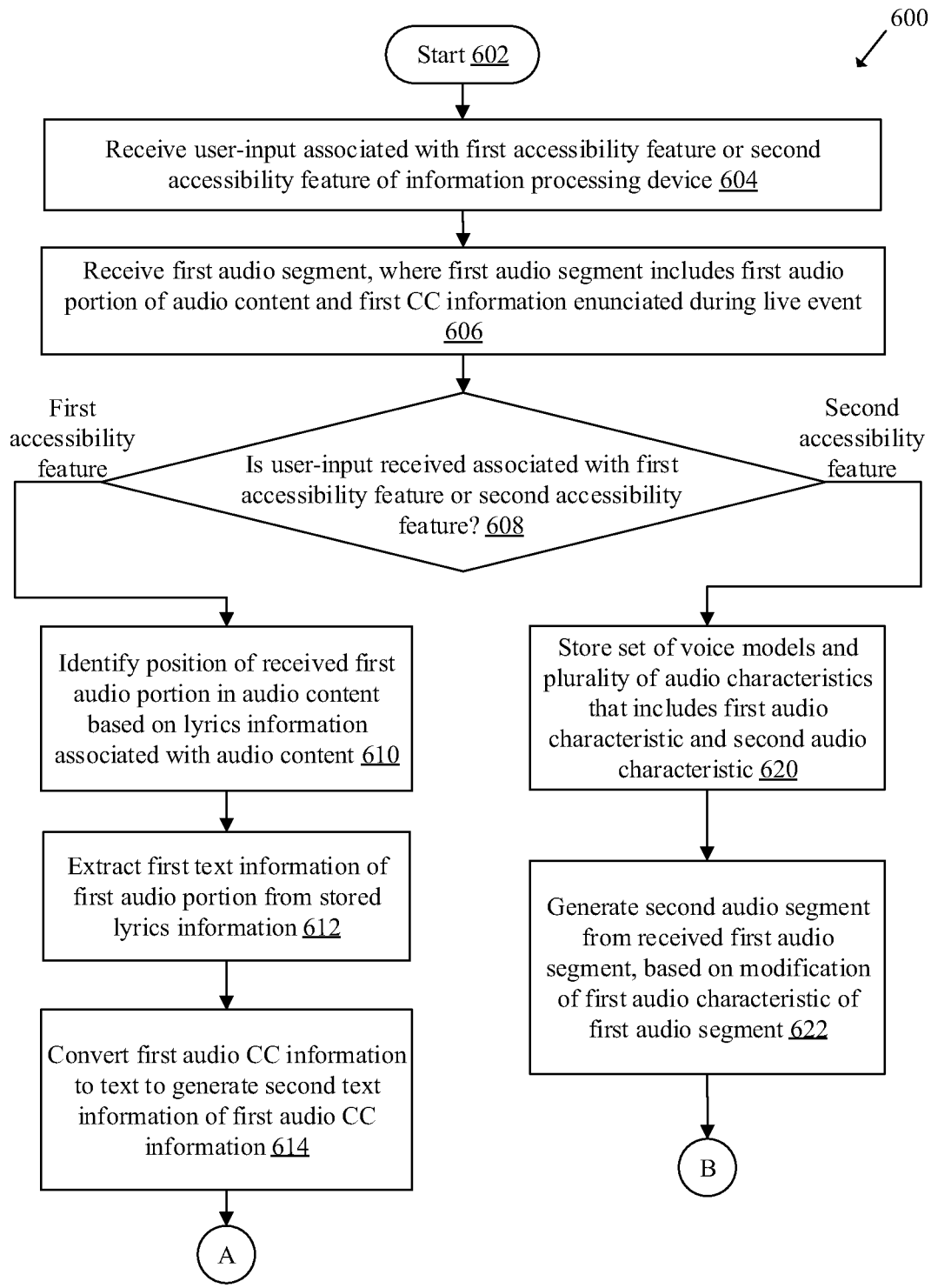
FIGS. 6A and 6B, collectively, depict a flowchart that illustrates exemplary operations for presentation of audio and visual content at live events based on user accessibility, in accordance with an embodiment of the disclosure.
Figure 6B:
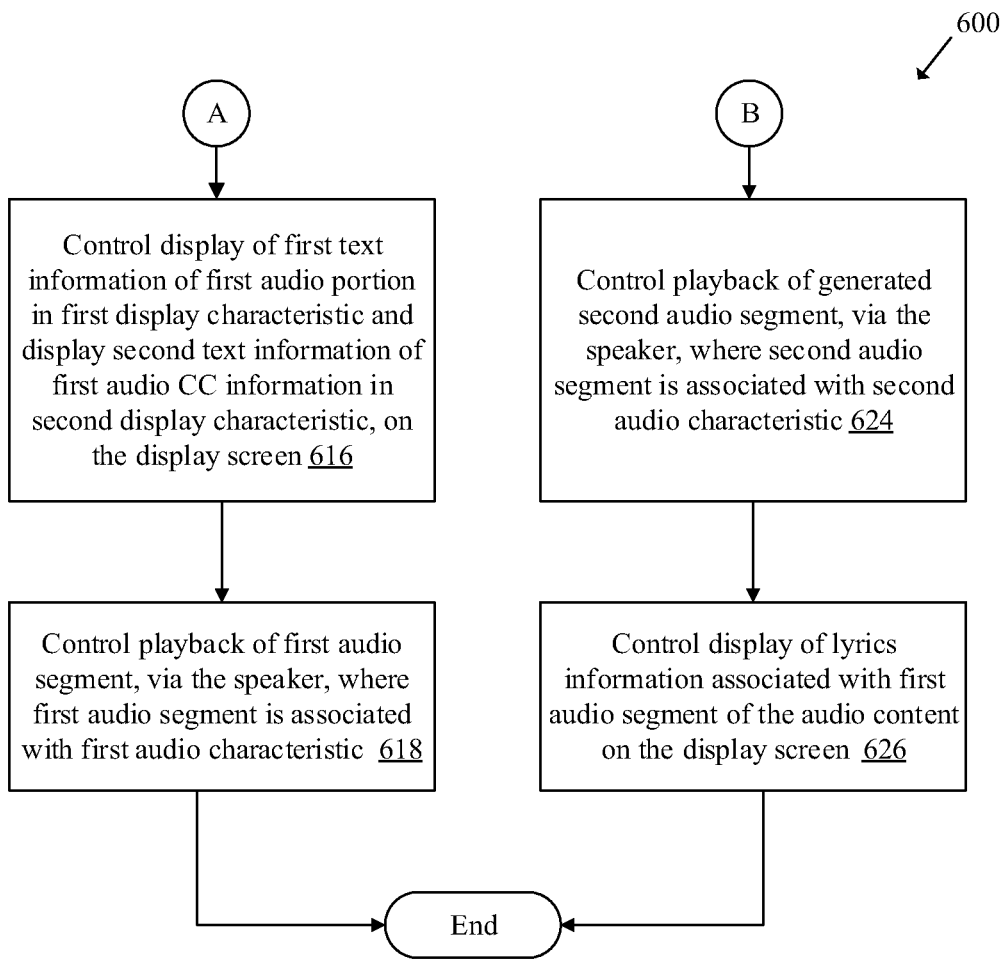

FIGS. 6A and 6B, collectively, depict a flowchart that illustrates exemplary operations for presentation of audio and visual content at live events based on user accessibility, in accordance with an embodiment of the disclosure. With reference to FIGS. 6A and 6B, there is shown a flowchart 600. The flowchart 600 is described in conjunction with FIGS. 1, 2, 3A, 3B, 3C, 4, 5A, and 5B. The operations from 604 to 626 may be implemented in the information processing device 102. The operations of the flowchart 600 may start at 602 and proceed to 604.

At 604, a user-input associated with a visual accessibility feature or an aural accessibility feature of the information processing device 102, may be received. The information processing device 102 may be configured to receive the user-input for selection of one of the visual accessibility feature and the aural accessibility feature from the first user 114 present in the live event. The first user 114 may select the visual accessibility feature or the aural accessibility feature of the information processing device 102.

At 606, a first audio segment may be received, where the first audio segment includes a first audio portion of the audio content (e.g., a song currently sung by the singer at the live event) and a first CC information (e.g., non-song phrases). The first audio segment may be captured by the audio capturing device 104. The information processing device 102 may be configured to receive the first audio segment from the audio capturing device 104. The first audio segment may be received from the first human speaker 116 associated with the audio capturing device 104. For example, during a live concert, the audio content may be a song sung by a singer on stage, then the first audio portion may be a portion of the song and the first audio CC information enunciated during the live event may be phrases enunciated by the singer while singing the song, such as "Hi there".

At 608, it is determined whether the user-input that is received is associated with the visual accessibility feature or the aural accessibility feature. In cases where the user-input for the visual accessibility feature is received, the control passes to 610. In cases where the user-input associated for the aural accessibility feature is received, the control passes to 620.

At 610, a position of the received first audio portion in the audio content may be identified, based on the lyrics information associated with the audio content. The memory 208 may be configured to store the lyrics information associated with the audio content. The circuitry 202 may be configured to identify the position of the received first audio portion in the audio content, such as a song. For example, the audio content may correspond to a song sung by a singer in a live concert and the first audio portion may correspond to a portion of the song in the first audio segment.

At 612, first text information of the first audio portion may be extracted from the stored lyrics information. The circuitry 202 may be configured to extract the first text information of the first audio portion from the stored lyrics information, based on the identified position of the first audio portion in the audio content. The first text information may be a text that corresponds to the first audio portion of the audio content in the first audio segment.

At 614, the first audio CC information may be converted to text to generate the second text information of the first audio CC information. The speech-to-text converter 204 may be configured to convert the first audio CC information enunciated in the live event by the by the first human speaker 116 to generate the second text information. In some embodiments, the speech-to-text converter 204 may be configured to convert a second audio CC information enunciated by a second human speaker in the live event.

At 616, display of the first text information of the first audio portion in a first display characteristic and display of the second text information of the first audio CC information in a second display characteristic may be controlled on the display screen 110. The circuitry 202 may be configured to control the display of the first text information of the first audio portion and the second text information of the first audio CC information on the display screen 110. In some embodiments, the first display characteristic and the second display characteristic may be selected by the first user 114 from the plurality of display characteristics. The display of the first text information in the first display characteristic and the second text information in the second display characteristic is shown and described, for example, in FIGS. 3A, 3B and 3C. In accordance with an embodiment, the circuitry 202 may be configured to control the display of the first text information at a first position and the second text information at a second position on the display screen 110. The first position may be different from the second position. The displayed first text information of the first audio portion and the second text information of the first audio CC information may be helpful to a plurality of users, such as hearing-impaired users, to understand the first audio portion and the first audio CC information of the first human speaker 116 during the live event.

At 618, playback of the first audio segment via the speaker 112 may be controlled, where the first audio segment may be associated with the first audio characteristic. The circuitry 202 may be configured to control the playback of the first audio segment associated with the first audio characteristic, via the speaker 112, along with the display of the first text information and the second text information on the display screen 110. In some embodiments, the circuitry 202 may be configured to control the playback of the second audio segment associated with the second audio characteristic, via the speaker 112, along with the display of the first text information and the second text information on the display screen 110. For example, in some cases, where a user, such as the first user 114 may be partially hearing-impaired, and may be able to hear sounds but that may be unclear, therefore, in such cases, the circuitry 202 may be configured to control the playback of the second audio segment, via the speaker 112. In such cases, the circuitry 202 may be further configured to control the display of the first text information and the second text information on the display screen 110 at the same time with the playback of the second audio segment.

At 620, a set of voice models and a plurality of audio characteristics that includes the first audio characteristic and the second audio characteristic may be stored. The memory 208 may be configured to store the set of voice models and the plurality of audio characteristics. Each audio characteristic of the plurality of audio characteristics may be a combination of a plurality of voice parameters associated with one of the stored set of voice models or the one or more human speakers (such as the first human speaker 116) at the live event. The first audio characteristic of the first audio segment may be different from the second audio characteristic.

At 622, a second audio segment may be generated from the received first audio segment, based on modification of the first audio characteristic of the first audio segment. The audio converter 206 may be configured to modify the first audio characteristic of the first audio segment to the second audio characteristic, to generate the second audio segment.

The audio converter 206 may be configured to modify at least one voice parameter of the plurality of voice parameters associated with the first audio characteristic of the first audio segment. The audio converter 206 may modify the first audio characteristic of the first audio segment in accordance with a first voice model of the set of voice models to generate the second audio segment. In accordance with an embodiment, the first user 114 may select the first voice model from the set of voice models.

At 624, playback of the generated second audio segment, via the speaker 112, may be controlled, where the second audio segment is associated with the second audio characteristic. The circuitry 202 may be configured to control the playback of the second audio segment, via the speaker 112. The second audio segment may be associated with the second audio characteristic. The second audio segment may be helpful to a plurality of users, such as visually-impaired users, to understand the first audio segment of the first human speaker 116 (such as the artist) at a second audio characteristic which may be clear and accurate to the first user 114.

At 626, display of lyrics information associated with the first audio segment of the audio content on the display screen 110 may be controlled. The circuitry 202 may be configured to control the display of the lyrics information of the first audio segment on the display screen 110. The lyrics information of the audio content (such as music) may be stored in the memory 208. In some embodiments, the circuitry 202 may be configured to control the display of the first text information of the first audio portion and the second text information of the first audio CC information on the display screen 110 to along with the playback the second audio segment via the speaker 112. For example, in some cases, where a user, such as the first user 114 may be partially visually-impaired, and may be able to see but that may be unclear, therefore, in such cases, the circuitry 202 may be configured to control display of the first text information and the second text information on the display screen 110 and control the speaker 112 to output the second audio segment at the same time. The control may pass to end.

Exemplary aspects of the disclosure may include an information processing device (such as the information processing device 102) that includes a circuitry (such as the circuitry 202) configured to receive a user-input for selection of one of a visual accessibility feature and an aural accessibility feature of the information processing device 102. The user-input may be received at a live event. The circuitry 202 may be configured to receive a first audio segment at the live event from an audio capturing device (such as the audio capturing device 104). The first audio segment may correspond to audio content associated with one or more human speakers at the live event. The first audio segment may comprise a first audio portion of the audio content and a first audio closed caption (CC) information. The circuitry 202 may be further configured to control display of first text information (such as the first text 302 (FIG. 3A)) for the first audio portion and second text information (such as the second text 304 (FIG. 3A)) for the first audio CC information on a display screen (such as the display screen 110), based on the received user-input for the selection of the visual accessibility feature. The first text information may be associated with a first display characteristic that is different from a second display characteristic associated with the second text information. The circuitry 202 may be configured to generate a second audio segment from the received first audio segment based on a first audio characteristic of the received first audio segment. The second audio segment may be further generated based on the received user-input for the selection of the aural accessibility feature. The circuitry 202 may be configured to control playback of the generated second audio segment via a speaker (such as the speaker 112), based on the received user-input for the selection of the aural accessibility feature. The second audio characteristic of the generated second audio segment may be different from the first audio characteristic.

In accordance with an embodiment, the circuitry 202 may be configured to receive a plurality of audio segments that comprises the first audio segment, captured from the audio capturing device 104 at the live event. The first audio characteristic of the received first audio segment may be associated with the one or more human speakers at the live event. The information processing device 102 may further comprise a speech-to-text converter (such as the speech-to-text converter 204) configured to convert the first audio CC information to the second text information displayed on the display screen 110. The information processing device 102 may further comprise a memory (such as the memory 208) configured to store lyrics information associated with the audio content. The circuitry 202 may be configured to identify a position of the received first audio portion in the audio content based on the stored lyrics information, based on the received user-input for the selection of the visual accessibility feature. The circuitry 202 may be further configured to extract the first text information of the first audio portion from the stored lyric information based on the identified position. The circuitry 202 may be configured to control the display of the extracted first text information in accordance with the first display characteristic, onto the display screen 110 and control the playback of the received first audio segment.

In accordance with an embodiment, the circuitry 202 is further configured to control the display of the first text information at a first position and the second text information at a second position on the display screen 110, based on the received user-input for the selection of the visual accessibility feature. The first position of the first text information may be different from the second position of the second text information. The circuitry 202 may be configured to select the first display characteristic and the second display characteristic from a plurality of display characteristics based on the received user-input for the selection of the visual accessibility feature.

The plurality of display characteristics may comprise a foreground color, a background color, a contrast value, a brightness value, a font style, or a font size of the first text information and the second text information displayed on the display screen 110. In accordance with an embodiment, the memory 208 may be configured to store a set of voice models and a plurality of audio characteristics that includes the first audio characteristic and the second audio characteristic. Each audio characteristic of the plurality of audio characteristics may be a combination of a plurality of voice parameters associated with one of the stored set of voice models or the one or more human speakers at the live event. The plurality of voice parameters may comprise a loudness parameter, an intonation parameter, an intensity of overtones, a voice modulation parameter, a pitch parameter, a tone parameter, and a rate-of-speech parameter. The plurality of voice parameters may further comprise a voice quality parameter, a phonetic parameter, a pronunciation parameter, a prosody parameter, a timbre parameter, and one or more psychoacoustic parameters.

In accordance with an embodiment, the circuitry 202 may be configured to modify the first audio characteristic to the second audio characteristic to generate the second audio segment based on the received user-input for the selection of the aural accessibility feature. The first audio characteristic may be modified in accordance with a first voice model of the set of voice models. The first voice model may correspond to a human subject who is different from the one or more human speakers at the live event. The circuitry 202 may be further configured to modify the first audio characteristic to the second audio characteristic to generate the second audio segment based on the received user-input for the selection of the aural accessibility feature. In accordance with an embodiment, the first audio characteristic may be modified in accordance with a second voice model of the set of voice models. The second voice model may correspond to a human subject who uses the information processing device 102. The circuitry 202 may be further configured to modify at least one voice parameter of the plurality of voice parameters associated with the first audio segment based on the received user-input for the selection of the aural accessibility feature. The at least one voice parameter may be modified to generate the second audio segment having the second audio characteristic that comprises the modified at least one voice parameter. The circuitry 202 may be further configured to control the display of the first text information of the first audio portion and the second text information of the first audio CC information based on the received user-input for the selection of the aural accessibility feature.

In accordance with an embodiment, the first audio segment may further comprise a second audio portion of the audio content and a second audio CC information associated with the one or more human speakers at the live event. The circuitry 202 may be further configured to control the display of third text information (such as the third text 504 (FIG. 5A)) for the second audio portion and fourth text information (such as the fourth text 506 (FIG. 5A)) for the second audio CC information on the display screen 110. The display of the third text information and the fourth text information may be controlled based on the received user-input for the selection of the visual accessibility feature. The third text information may be displayed in accordance with a third display characteristic and the fourth text information may be displayed in accordance with a fourth display characteristic. The third display characteristic and the fourth display characteristic may be different from the first display characteristic and the second display characteristic.

In accordance with an embodiment, the circuitry 202 may be configured to control the display of the first text information of the first audio portion and the second text information of the first audio CC information at a first position on the display screen 110. The display of the first text information and the second text information may be controlled at the first position, based on the received user-input for the selection of the visual accessibility feature. The circuitry 202 may be further configured to control the display of the third text information of the second audio portion and the fourth text information of the second audio CC information at a second position on the display screen 110. The first position of the first text information and the second text information may be different from the second position of the third text information and the fourth text information. The circuitry 202 may be further configured to control the display of a first image of the one or more human speakers on display screen 110 based on the received user-input for the selection of the visual accessibility feature.

In accordance with an embodiment, the circuitry 202 may be communicatively coupled to a head mounted device (HMD) (such as the HMD 402 (FIG. 4)). The circuitry 202 may be configured to control the playback of the second audio segment via the speaker 112 associated with the HMD 402 based on the received user-input for the selection of the aural accessibility feature. The circuitry 202 may be further configured to control the display of the first text information and the second text information onto the display screen 110 associated with the HMD 402 based on the received user-input for the selection of the visual accessibility feature. In accordance with an embodiment, the information processing device 102 may be the HMD 402 that comprises the display screen 110 and the speaker 112.

Various embodiments of the disclosure may provide a non-transitory, computer-readable medium and/or storage medium, and/or a non-transitory machine readable medium and/or storage medium having stored thereon, a set of instructions executable by a machine and/or a computer that comprises one or more hardware processors and/or circuits. The set of instructions may be executable by the one or more hardware processors and/or circuits in the machine and/or the computer to perform the steps that may comprise receiving a user-input for selection of one of a visual accessibility feature and an aural accessibility feature of the information processing device. The user-input may be received at a live event. A first audio segment at the live event may be received from an audio capturing device. The first audio segment may correspond to audio content associated with one or more human speakers at the live event. The first audio segment may comprise a first audio portion of the audio content and a first audio closed caption (CC) information. A display of first text information for the first audio portion and second text information for the first audio CC information may be controlled on a display screen, based on the received user-input for the selection of the visual accessibility feature. The first text information may be associated with a first display characteristic that is different from a second display characteristic associated with the second text information. A second audio segment may be generated from the received first audio segment based on a first audio characteristic of the received first audio segment. The second audio segment may be generated further based on the received user-input for the selection of the aural accessibility feature. A playback of the generated second audio segment may be controlled via a speaker, based on the received user-input for the selection of the aural accessibility feature. A second audio characteristic of the generated second audio segment may be different from the first audio characteristic.

The present disclosure may be realized in hardware, or a combination of hardware and software. The present disclosure may be realized in a centralized fashion, in at least one computer system, or in a distributed fashion, where different elements may be spread across several interconnected computer systems. A computer system or other apparatus adapted to carry out the methods described herein may be suited. A combination of hardware and software may be a general-purpose computer system with a computer program that, when loaded and executed, may control the computer system such that it carries out the methods described herein. The present disclosure may be realized in hardware that comprises a portion of an integrated circuit that also performs other functions.

The present disclosure may also be embedded in a computer program product, which comprises all the features that enable the implementation of the methods described herein, and which when loaded in a computer system is able to carry out these methods. Computer program, in the present context, means any expression, in any language, code or notation, of a set of instructions intended to cause a system with information processing capability to perform a particular function either directly, or after either or both of the following: a) conversion to another language, code or notation; b) reproduction in a different material form.

While the present disclosure is described with reference to certain embodiments, it will be understood by those skilled in the art that various changes may be made and equivalents may be substituted without departure from the scope of the present disclosure. In addition, many modifications may be made to adapt a particular situation or material to the teachings of the present disclosure without departure from its scope. Therefore, it is intended that the present disclosure not be limited to the particular embodiment disclosed, but that the present disclosure will include all embodiments that fall within the scope of the appended claims

What is claimed is:

1. An information processing device, comprising:
   circuitry configured to:
   receive a user-input for selection of one of a visual accessibility feature and an aural accessibility feature of the information processing device, wherein the user-input is received at a live event;
   receive a first audio segment at the live event from an audio capturing device, wherein the first audio segment corresponds to audio content associated with one or more human speakers at the live event, and wherein the first audio segment comprises a first audio portion of the audio content and a first audio closed caption (CC) information;
   control display of first text information for the first audio portion and second text information for the first audio CC information on a display screen, based on the received user-input for the selection of the visual accessibility feature, wherein the first text information is associated with a first display characteristic that is different from a second display characteristic associated with the second text information;
   generate a second audio segment from the received first audio segment based on a first audio characteristic of the received first audio segment, wherein the second audio segment is further generated based on the received user-input for the selection of the aural accessibility feature;
   control playback of the generated second audio segment via a speaker based on the received user-input for the selection of the aural accessibility feature, wherein a second audio characteristic of the generated second audio segment is different from the first audio characteristic; and
   store a set of voice models and a plurality of audio characteristics that includes the first audio characteristic and the second audio characteristic, wherein each audio characteristic of the plurality of audio characteristics is a combination of a plurality of voice parameters associated with one of the stored set of voice models or the one or more human speakers at the live event.

2. The information processing device according to claim 1, wherein the circuitry is further configured to receive a plurality of audio segments that comprises the first audio segment, captured from the audio capturing device at the live event.

3. The information processing device according to claim 1, wherein the first audio characteristic of the received first audio segment is associated with the one or more human speakers at the live event.

4. The information processing device according to claim 1, further comprising a speech-to-text converter configured to convert the first audio CC information to the second text information displayed on the display screen.

5. The information processing device according to claim 1, further comprising a memory configured to store lyrics information associated with the audio content.

6. The information processing device according to claim 5,
   wherein based on the received user-input for the selection of the visual accessibility feature, the circuitry is further configured to:
      identify a position of the received first audio portion in the audio content based on the stored lyrics information;
      extract the first text information of the first audio portion from the stored lyric information based on the identified position;
      control the display of the extracted first text information in accordance with the first display characteristic, onto the display screen; and
      control playback of the received first audio segment.

7. The information processing device according to claim 1,
   wherein the circuitry is further configured to control the display of the first text information at a first position on the display screen and the second text information at a second position on the display screen based on the received user-input for the selection of the visual accessibility feature, and
   wherein the first position is different from the second position.

8. The information processing device according to claim 1, wherein the circuitry is further configured to select the first display characteristic and the second display characteristic from a plurality of display characteristics based on the received user-input for the selection of the visual accessibility feature.

9. The information processing device according to claim 8, wherein the plurality of display characteristics comprises a foreground color, a background color, a contrast value, a brightness value, a font style, or a font size of the first text information and the second text information displayed on the display screen.

10. The information processing device according to claim 1, wherein the plurality of voice parameters comprises a loudness parameter, an intonation parameter, an intensity of overtones, a voice modulation parameter, a pitch parameter, a tone parameter, a rate-of-speech parameter, a voice quality parameter, a phonetic parameter, a pronunciation parameter, a prosody parameter, a timbre parameter, and one or more psychoacoustic parameters.

11. The information processing device according to claim 1, wherein the circuitry is further configured to modify the first audio characteristic to the second audio characteristic to generate the second audio segment based on the received user-input for the selection of the aural accessibility feature, wherein the first audio characteristic is modified in accordance with a first voice model of the set of voice models, and wherein the first voice model corresponds to a human subject who is different from the one or more human speakers at the live event.

12. The information processing device according to claim 1, wherein the circuitry is further configured to modify the first audio characteristic to the second audio characteristic to generate the second audio segment based on the received user-input for the selection of the aural accessibility feature, wherein the first audio characteristic is modified in accordance with a second voice model of the set of voice models, and wherein the second voice model corresponds to a human subject who uses the information processing device.

13. The information processing device according to claim 1, wherein the circuitry is further configured to modify at least one voice parameter of the plurality of voice parameters associated with the first audio segment based on the received user-input for the selection of the aural accessibility feature, and wherein the at least one voice parameter is modified to generate the second audio segment having the second audio characteristic that comprises the modified at least one voice parameter.

14. The information processing device according to claim 1,
wherein the circuitry is further configured to control the display of the first text information of the first audio portion and the second text information of the first audio CC information based on the received user-input for the selection of the aural accessibility feature.

15. The information processing device according to claim 1, wherein the first audio segment further comprises a second audio portion of the audio content and a second audio CC information associated with the one or more human speakers at the live event.

16. The information processing device according to claim 15,
wherein the circuitry is further configured to control display of third text information for the second audio portion and fourth text information for the second audio CC information on the display screen based on the received user-input for the selection of the visual accessibility feature,
wherein the third text information is displayed in accordance with a third display characteristic and the fourth text information is displayed in accordance with a fourth display characteristic, and
wherein the third display characteristic and the fourth display characteristic are different from the first display characteristic and the second display characteristic.

17. The information processing device according to claim 16,
wherein, based on the received user-input for the selection of the visual accessibility feature, the circuitry is further configured to:
control the display of the first text information of the first audio portion and the second text information of the first audio CC information at a first position on the display screen; and
control the display of the third text information of the second audio portion and the fourth text information of the second audio CC information at a second position on the display screen,
wherein the first position is different from the second position.

18. The information processing device according to claim 1,
wherein the circuitry is further configured to control display of a first image of the one or more human speakers on display screen based on the received user-input for the selection of the visual accessibility feature.

19. The information processing device according to claim 1,
wherein the circuitry is communicatively coupled to a head mounted device (HMD), and
wherein the circuitry is further configured to:

control the playback of the second audio segment via the speaker associated with the HMD based on the received user-input for the selection of the aural accessibility feature; and
control the display of the first text information and the second text information onto the display screen associated with the HMD based on the received user-input for the selection of the visual accessibility feature.

20. The information processing device according to claim 1, wherein the information processing device is a head mounted device (HMD) that comprises the display screen and the speaker.

21. A method, comprising:
in an information processing device that comprises circuitry:
receiving, by the circuitry, a user-input for selection of one of a visual accessibility feature and an aural accessibility feature of the information processing device, wherein the user-input is received at a live event;
receiving, by the circuitry, a first audio segment at the live event from an audio capturing device, wherein the first audio segment corresponds to audio content associated with one or more human speakers at the live event, and wherein the first audio segment comprises a first audio portion of the audio content and a first audio closed caption (CC) information;
controlling, by the circuitry, display of first text information for the first audio portion and second text information for the first audio CC information on a display screen, based on the received user-input for the selection of the visual accessibility feature, wherein the first text information is associated with a first display characteristic that is different from a second display characteristic associated with the second text information;
generating, by the circuitry, a second audio segment from the received first audio segment based on a first audio characteristic of the received first audio segment, wherein the second audio segment is generated further based on the received user-input for the selection of the aural accessibility feature;
controlling, by the circuitry, playback of the generated second audio segment via a speaker based on the received user-input for the selection of the aural accessibility feature, wherein a second audio characteristic of the generated second audio segment is different from the first audio characteristic; and
storing, by the circuitry, a set of voice models and a plurality of audio characteristics that includes the first audio characteristic and the second audio characteristic, wherein each audio characteristic of the plurality of audio characteristics is a combination of a plurality of voice parameters associated with one of the stored set of voice models or the one or more human speakers at the live event.

22. A non-transitory computer-readable medium having stored thereon, computer-executable instructions which, when executed by an information processing device, cause the information processing device to execute operations, the operations comprising: receiving a user-input for selection of one of a visual accessibility feature and an aural accessibility feature of the information processing device, wherein the user-input is received at a live event; receiving a first audio segment at the live event from an audio capturing device, wherein the first audio segment corresponds to audio content associated with one or more human speakers at the live event, and wherein the first audio segment comprises a first audio portion of the audio content and a first audio closed caption (CC) information; controlling display of first text information for the first audio portion and second text information for the first audio CC information on a display screen, based on the received user-input for the selection of the visual accessibility feature, wherein the first text information is associated with a first display characteristic that is different from a second display characteristic associated with the second text information; generating a second audio segment from the received first audio segment based on a first audio characteristic of the received first audio segment, wherein the second audio segment is generated further based on the received user-input for the selection of the aural accessibility feature controlling playback of the generated second audio segment via a speaker based on the received user-input for the selection of the aural accessibility feature, wherein a second audio characteristic of the generated second audio segment is different from the first audio characteristic; and storing a set of voice models and a plurality of audio characteristics that includes the first audio characteristic and the second audio characteristic, wherein each audio characteristic of the plurality of audio characteristics is a combination of a plurality of voice parameters associated with one of the stored set of voice models or the one or more human speakers at the live event.

\* \* \* \* \*